United States Patent
Thomas et al.

(10) Patent No.: US 7,502,903 B2
(45) Date of Patent: *Mar. 10, 2009

(54) METHOD AND APPARATUS FOR MANAGING DATA STORAGE SYSTEMS

(75) Inventors: Sushil Thomas, San Francisco, CA (US); Ashok Singhal, Redwood City, CA (US)

(73) Assignee: 3PAR, Inc., Fremont, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 11/269,399

(22) Filed: Nov. 7, 2005

(65) Prior Publication Data
US 2006/0259727 A1 Nov. 16, 2006

Related U.S. Application Data

(60) Provisional application No. 60/680,721, filed on May 13, 2005.

(51) Int. Cl.
*G06F 12/02* (2006.01)
(52) U.S. Cl. .................. 711/165; 711/114; 711/170; 711/135; 711/138; 711/141; 711/142; 711/152; 711/202
(58) Field of Classification Search ........... 711/135, 711/165
See application file for complete search history.

(56) References Cited

U.S. PATENT DOCUMENTS

| | | | |
|---|---|---|---|
| 5,606,681 A * | 2/1997 | Smith et al. ............... 711/203 |
| 5,895,488 A * | 4/1999 | Loechel ..................... 711/135 |
| 6,529,995 B1 | 3/2003 | Shepherd | |
| 6,704,839 B2 | 3/2004 | Butterworth et al. | |
| 7,017,007 B2 * | 3/2006 | Suzuki et al. ............ 711/114 |
| 2002/0087822 A1 | 7/2002 | Butterworth | |
| 2004/0103261 A1 | 5/2004 | Honda et al. | |
| 2006/0259687 A1 | 11/2006 | Thomas et al. | |

* cited by examiner

*Primary Examiner*—Matt Kim
*Assistant Examiner*—Hetul Patel
(74) *Attorney, Agent, or Firm*—Patent Law Group LLP; David C. Hsia

(57) ABSTRACT

A method is provided for a data storage system to move data from a source logical disk (LD) region to a target LD region while the data storage system remains online to a host. The method includes determining if a region move will create excessive load so the data storage system appears offline to the host. If not, the method includes causing writes to the source LD region to be mirrored to the target LD region, causing data in the source LD region to be copied to the target LD region, blocking reads and writes to the data storage system, and flushing dirty cache in the data storage system. If flushing the dirty cache is fast so the data storage system appears online to the host, the method includes updating mappings of the virtual volume to the LD regions and resuming the reads and writes to the data storage system.

18 Claims, 16 Drawing Sheets

METHOD AND APPARATUS FOR MANAGING DATA STORAGE SYSTEMS

CROSS REFERENCE TO RELATED APPLICATIONS

This application claims benefit of U.S. Provisional Application No. 60/680,721, entitled "Region Mover," which was filed on May 13, 2005 and is incorporated herein by reference. This application is related to U.S. patent application Ser. No. 11/269,024, entitled "Region Mover Applications," which is filed concurrently, commonly assigned, and incorporated herein by reference.

FIELD OF INVENTION

This invention relates to managing virtual volumes in data storage systems.

DESCRIPTION OF RELATED ART

FIG. 1 illustrates an exemplary data storage system 100 coupled to host devices 102. Data storage system 100 includes controller nodes 104-1 and 104-2 each coupled to physical disk drives 106. Controller nodes 104-1 and 104-2 are interconnected by a primary high speed node-to-node link 108 and a secondary low speed node-to-node link (not shown). Each controller node is coupled to host devices 102. Each controller node contains separate memory and processing complexes for data movement and control functions (e.g., an ASIC and associated memory for data movement, and Intel CPUs and associated memory for control functions). Although only two controller nodes are shown, data storage system 100 may include additional controller nodes interconnected by node-to-node links. Physical disk drives 106 are mounted in one or more drive magazines in one or more drive cages.

In data storage system 100, a primary controller node and a backup controller node are assigned to each physical disk drive. Typically, the primary controller node controls access to the physical disk drive and the backup controller node takes over when the primary controller node fails. The controller node that currently controls the physical disk drive is referred to as the owner controller node.

FIG. 2 illustrates an exemplary storage virtualization provided by controller nodes 104-1 and 104-2 to host devices 102. First, physical disk drives 106 are broken into "chunklets" of a uniform size. Second, the chunklets are organized into one or more logical disks with the desired RAID type, the desired layout characteristics, and the desired performance characteristics. Third, all or portions of a logical disk or multiple logical disks are organized into one or more virtual volumes. Soft copies of the virtual volume to logical disk mapping are saved in the random access memories (RAMs) of all the controller nodes. Soft copies of the logical disk to chunklet mapping are saved in the RAMs of the primary and the back controller nodes. Hard copies of the virtual volume to logical disk to chunklet mapping are saved in tables of contents on each physical disk drive or in one physical disk driver per drive magazine in data storage system 100.

Further details of the data storage system 100 are provided in U.S. Pat. No. 6,658,478, entitled "Data Storage System," U.S. patent application Ser. No. 09/883,681, entitled "Node Controller for a Data Storage System," U.S. patent application Ser. No. 10/655,951, entitled "Time and Space Efficient Technique for Creating Virtual Volume Copies," and U.S. patent application Ser. No. 10/636,145, entitled "On-Demand Allocation of Physical Storage for Virtual Volumes."

A user may wish to change the RAID type, the layout characteristics, or the performance characteristics of a virtual volume (e.g., after the user purchases new drive cages, new drive magazines, or new controller nodes, or a user's requirements for a virtual volume change over time). Layout characteristics include the radial placement of data on inner or outer tracks of disk platters, the layout of the virtual volume over new physical disk drives, the layout of the virtual volume over new types of physical disk drives, and the layout of the virtual volume over physical disk drives coupled to different controller nodes. After a virtual volume is created, its RAID type, layout characteristics, and performance characteristics cannot be changed while data storage system 100 remains online (i.e., while the virtual volume remains accessible to host devices 102). Thus, what is needed is a method that allows the RAID type, the layout characteristics, and the performance characteristics of a virtual volume to be changed while data storage system 100 remains online.

SUMMARY

In one embodiment of the invention, a method is provided for a data storage system to change one or more characteristics of a virtual volume, including its RAID type, layout, and performance, while the data storage system remains online to provide non-disruptive storage service to a host device. The virtual volume is mapped to logical disk regions ("LD regions") in one or more logical disks, and the LD regions are mapped to chunklets in one or more physical storage devices. To change the characteristics of the virtual volume, a system manager in the data storage system moves data from source LD regions to target LD regions (hereafter "region moves") with the desired characteristics while taking steps so the data storage system remains online to the host device.

In one embodiment of the invention, the method includes determining if moving data from a source LD region to a target region will create excessive load on the physical storage devices so that the data storage system appears offline to the host device. If the region move will not create excessive load, the method further includes causing writes to the source LD region to be mirrored to the target LD region and causing the data in the source LD region to be copied to the target LD region. The method then includes blocking reads and writes to the data storage system and flushing dirty cache in the data storage system to the physical storage devices. If flushing the dirty cache is fast so the data storage system remains online to the host device, the method further includes updating mappings of the virtual volume to the LD regions and resuming the reads and writes to the data storage system.

BRIEF DESCRIPTION OF THE DRAWINGS

Use of the same reference numbers in different figures indicates similar or identical elements.

DETAILED DESCRIPTION

Figure 1:
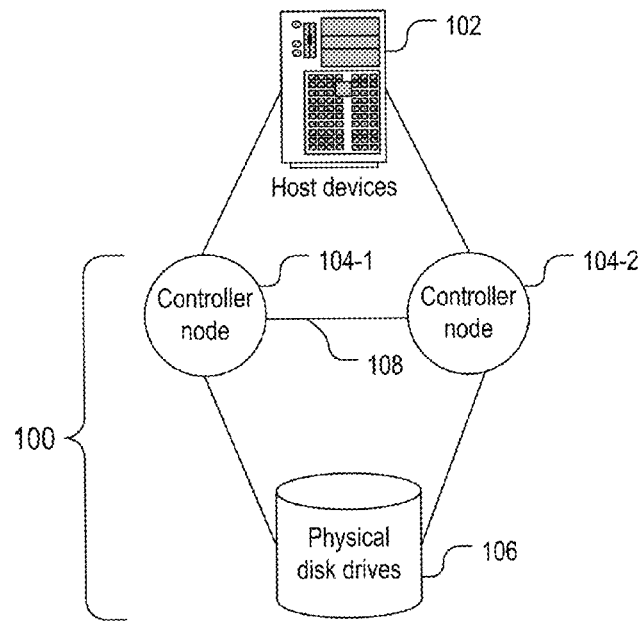
FIG. 1 illustrates an exemplary data storage system coupled to host devices.
Figure 2:
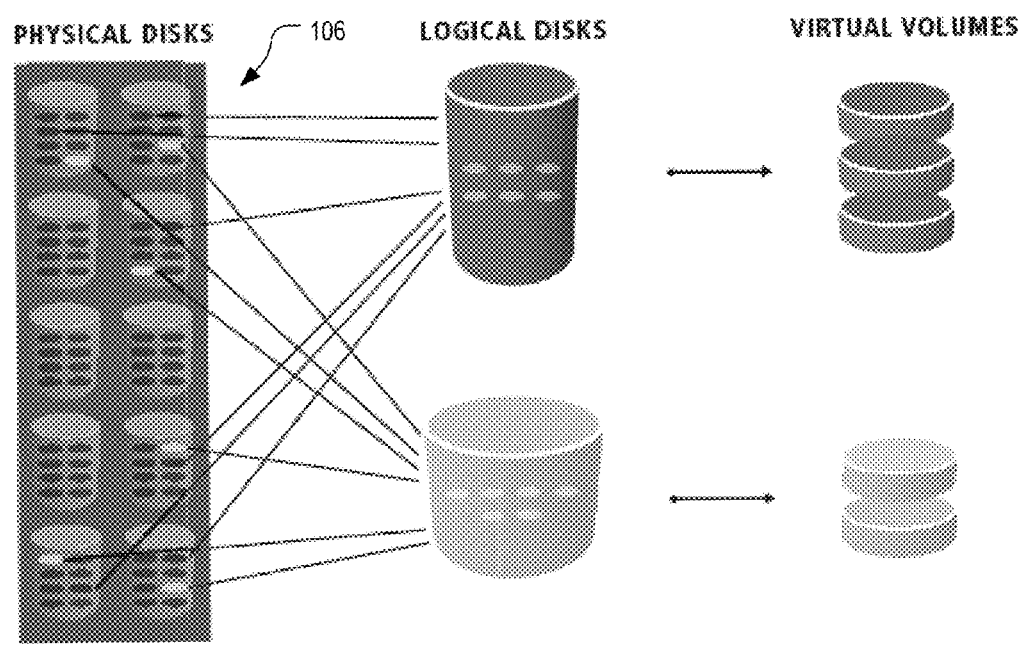
FIG. 2 illustrates storage virtualization provided by the data storage system to the host devices of FIG. 1.
Figure 3:
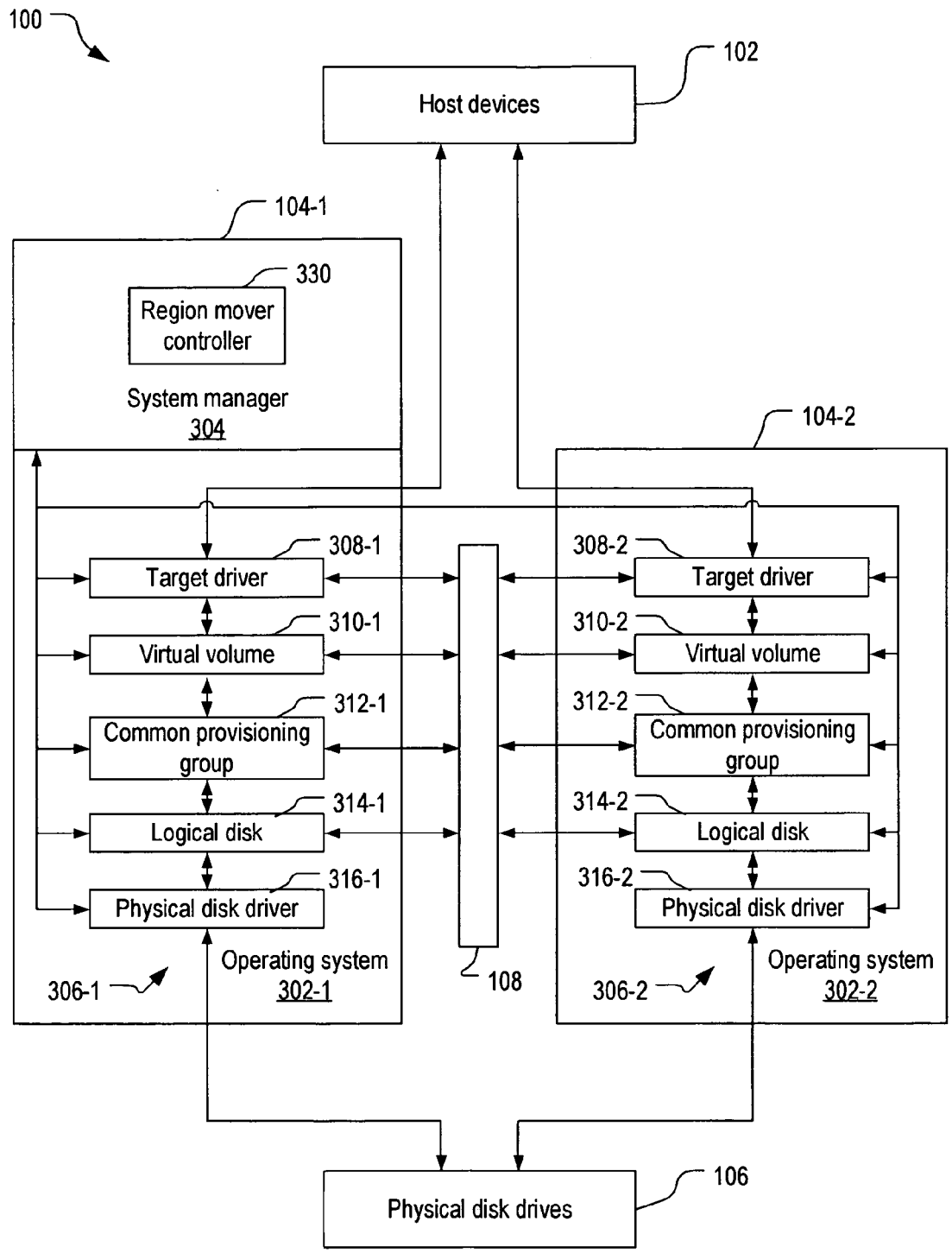
FIG. 3 illustrates software architecture of the data storage system in one embodiment of the invention.

FIG. 3 illustrates software architecture of data storage system 100 in one embodiment of the invention. Controller node 104-1 executes an operating system 302-1 and a system manager 304 residing above operating system 302-1. Operating system 302-1 has a data stack 306-1 consisting of a target driver 308-1, a virtual volume layer 310-1, common provisioning group (CPG) layer 312-1, a logical disk layer 314-1, and a physical disk driver 316-1.

Physical disk driver 316-1 organizes physical disk drives 106 into a pool of chunklets. In one embodiment, each chunklet is 256 megabytes of contiguous disk space. Although physical disk drives are shown, physical disk driver 316-1 can organize other physical storage devices into a pool of physical storage regions.

Logical disk layer 314-1 organizes the chunklets into logical disks of the desired RAID type, the desired layout characteristics, and the desired performance characteristics. In one embodiment of the invention, the logical disk in data storage system 100 is defined as follows.

A logical disk is composed of chunklets from physical disk drives that are local to a common controller node. In other words, these physical disk drives are on drive magazines and drive cages that are local to the common controller node.

A number of chunklets are organized into a set. The number of chunklets in each set (i.e., set size) is determined by the RAID type of the logical disk. For example, a RAID 1 logic disk could have two chunklets in each set, where the data is written to a primary chunklet and mirrored to a backup chunklet. Similarly, a RAID 5 logical disk could have four chunklets in each set, where the data is striped across threes of the chunklets and parity is written to one of the chunklets. The chunklets in the same set are from different drive cages by default. This prevents a common drive cage failure from bringing down two (2) chunklets in a set.

Figure 9:
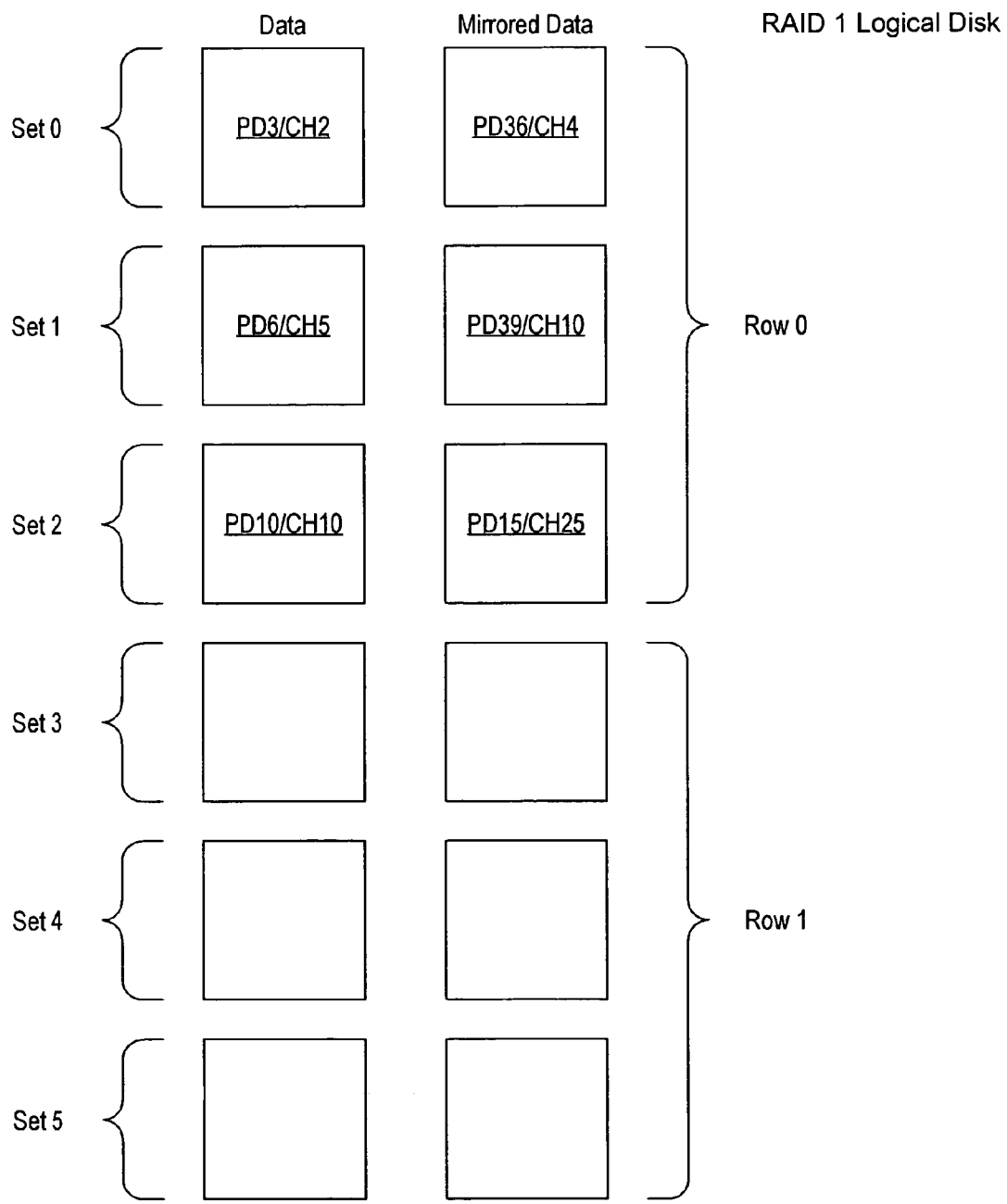
FIG. 9 illustrates a logical disk in one embodiment of the invention.

For example, FIG. 9 illustrates a RAID 1 logical disk having two chunklets in each set. Each chunklet is identified by its physical disk (PD) number and its chunklet (CH) number on that physical disk. Note that the physical disk numbers are very different in each set to signify that the chunklets are from different drive cages.

A number of sets are organized into a row. The number of sets in each row (i.e., row size) is determined by many factors, including the availability of chunklets from different local disk drives at the common controller node. This is because the chunklets in the same row are selected from different local disk drives by default. This is in turn because data is written to the logical disk across sets in the same row for faster writes.

For example, FIG. 9 illustrates a logical disk having a row size of three (3). Note that the physical disk numbers are different for all the chunklets in the same row.

When data is written to a logical disk, it is written across the sets where the amount of data written to each set is called the stripe size. Stripe size can also be thought of as an amount of data that is contiguous both in a chunklet and in a logical disk. The sets are written in cyclical order until the row is full. When the row is full, data is written to the next row.

Figure 10A:
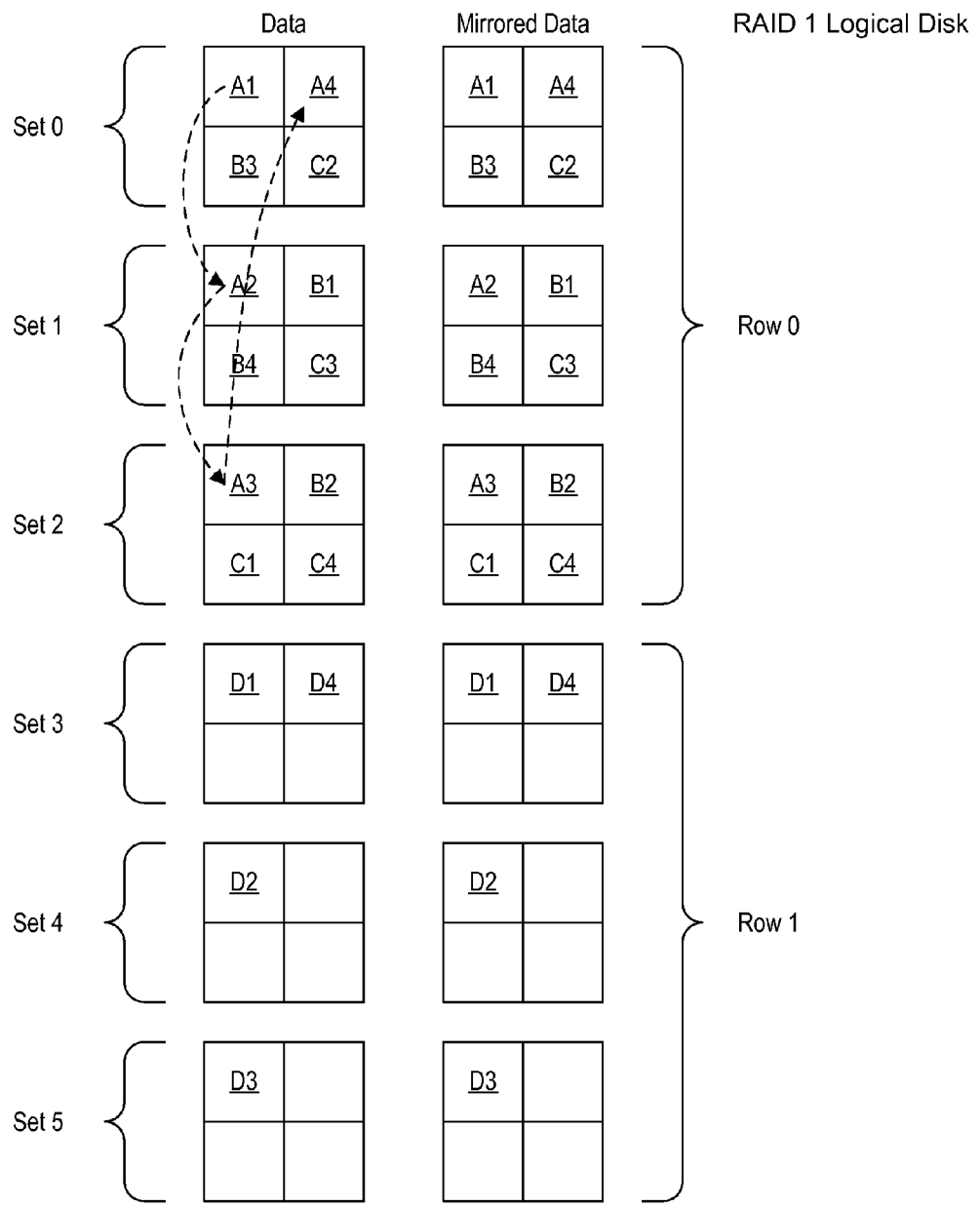
FIG. 10A illustrates data writes to a logical disk in one embodiment of the invention.

For example, FIG. 10A illustrates data writes to a logical disk. A data "A" is written to row 0. A first portion of data A is written to the chunklets in set 0 (i.e., written to a primary chunklet and mirrored to a backup chunklet). This is illustrated as a data portion A1 having the specified stripe size. A second portion of data A is written to the chunklets in set 1. This is illustrated as a data portion A2 having the specified stripe size. A third portion of data A is written to the chunklets in set 2. This is illustrated as a data portion A3 having the specified stripe size. As row 0 is not full, a fourth portion of data A is written to the chunklets in set 0. This is illustrated as a data portion A4 having the specified stripe size.

Figure 10B:
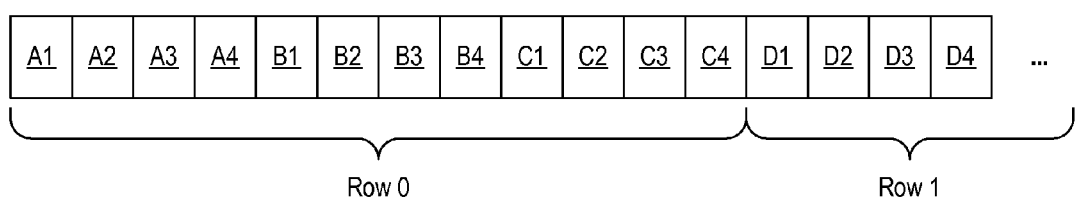
FIG. 10B illustrates the logical disk of FIG. 10A and its data arranged as a one-dimensional array in one embodiment of the invention.

Similarly, a data "B" is written as data portions B1, B2, B3, and B4 across sets 1, 2, 0, and 1 in row 0, respectively. Similarly, a data "C" is written as data portions C1, C2, C3, and C4 across sets 2, 0, 1, and 2 in row 0, respectively. At this point, row 0 is full. Thus, a data "D" is written as portions D1, D2, D3, and D4 across sets 3, 4, 5, and 3 in row 1, respectively, in the same manner described above for row 0. FIG. 10B illustrates the logical disk and its data arranged as a one-dimensional array. As can be seen, the stripe size is an amount of data that is contiguous in both the chunklets and the logical disk.

Referring back to FIG. 3, virtual volume layer 310-1 maps LD regions to virtual volume regions ("VV regions") in one or more virtual volumes. Virtual volume layer 310-1 also performs caching of recently accessed data blocks.

Figure 11:
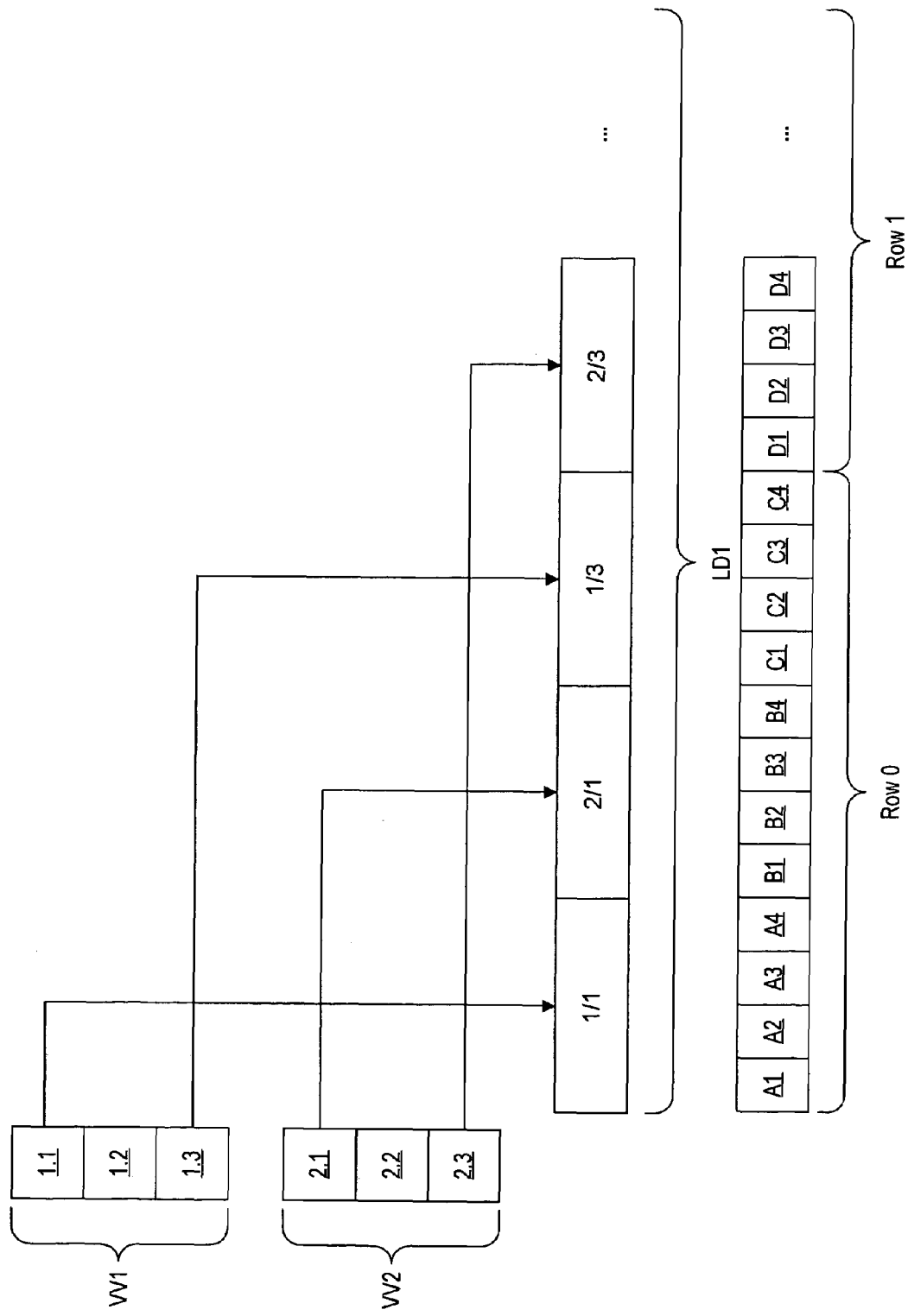
FIG. 11 illustrates a mapping of VV regions of two virtual volumes to LD regions of the logical disk of FIG. 10A in one embodiment of the invention.

FIG. 11 illustrates the mapping of LD regions to VV regions. A virtual volume VV1 has VV regions 1.1 and 1.3 mapped to LD regions 1/1 and 1/3 of logical disk LD1. Although not shown, virtual volume VV1 may have VV region 1.2 mappped to another logical disk. By mapping a virtual volume to multiple logical disks, both performance and redundancy are improved.

Similarly, a virtual volume VV2 has VV regions 2.1 and 2.3 mapped to LD regions 2/1 and 2/3 of logical disk LD1. Also shown is the corresponding mapping between the LD regions and the data portions in the chunklets previously described with respect to logical disk layer 314-1. Soft copies of the VV to LD region mapping are saved in the RAMs of all the controller nodes. Soft copies of the LD region to chunklet mapping are saved in the RAMs of the primary and the back controller nodes of the LD region in question. Hard copies of the VV to LD to chunklet mapping are saved in tables of contents on each physical disk drive or in one physical disk driver per drive magazine in data storage system 100

Referring back to FIG. 3, the mappings from chunklets to logical disks to virtual volumes are typically set at the creation of a virtual volume. Thus, the underlying chunklets and logical disks are allocated to a given virtual volume regardless of how much data has been written to that virtual volume.

As an alternative, CPG layer 312-1 allows logical disks to be allocated on an as-needed basis. CPG layer 312-1 allows the user to create a CPG with one or more logical disks that provide a buffer pool of LD regions, and a thin provisioned virtual volume ("TPVV") associated to the CPG. When the TPVV is created, only a fraction of its exported virtual capacity is mapped to the LD regions in the buffer pool. As application writes deplete the mapped LD regions to the TPVV, CPG layer 312-1 maps additional LD regions from the buffer pool to the TPVV. Over time, as the buffer pool runs low, CPG layer 312-1 creates additional logical disks to replenish the buffer pool.

Target driver 308-1 communicates read/write requests from host devices 102 to virtual volume layer 310-1. Host devices 102 send read/write requests to virtual volumes through target driver 308-1 using, e.g., the SCSI protocol. Although not shown, operating system 302-1 may provide higher level network data services including NFS, CIFS, and HTTP to allow file system export over native TCP/IP network services.

Similarly, controller node 104-2 executes an operating system 302-2 with a data stack 306-2 consisting of a target driver 308-2, a virtual volume layer 310-2, a CPG layer 312-2, a logical disk layer 314-2, and a physical disk driver 316-2. Components of data stacks 306-1 and 306-2 communicate by node-to-node link 108.

System manager 304 resides only on one of the controller nodes of data storage system 100. If system manager 304 fails at one of the controller nodes, it can be restarted at the same node. If the controller node itself fails, system manager 304 can be restarted at another controller node. System manager 304 keeps a single system image of data storage system 100. System manager 304 also services events from the data stacks, delivers configuration commands to the data stacks, and records system configuration information, including the physical disk to logical disk to virtual volume mapping, on one or more physical disk drives.

A user of data storage system 100 may desire (1) to modify the RAID type, the layout characteristics, and the performance characteristics of a virtual volume, (2) to modify the RAID type, the layout characteristics, and the performance characteristics of virtual volumes in a CPG, (3) to consolidate unused space in a logical disk, and (4) to consolidate unused space in logical disks in a CPG. Tasks (1) and (2) are particular important when the user adds additional disk drives, drive magazines, drive cages, or controller nodes to data storage system 100 and wishes to re-layout an existing virtual volume to achieve optimal performance. To accomplish these tasks, data storage system 100 preferably moves data from source LD regions to target LD regions while it remains online to provide non-disruptive storage service to host devices 102. Note that the source and the target LD regions can be located on the same logical disk or on different logical disks.

In one embodiment of the invention, system manager 304 includes a region mover controller 330 for moving data between LD regions. System manager 304 creates a region mover task with the region moves necessary to accomplish one of the applications described above. System manager 304 queues the region mover task to region mover controller 330.

Figure 4:
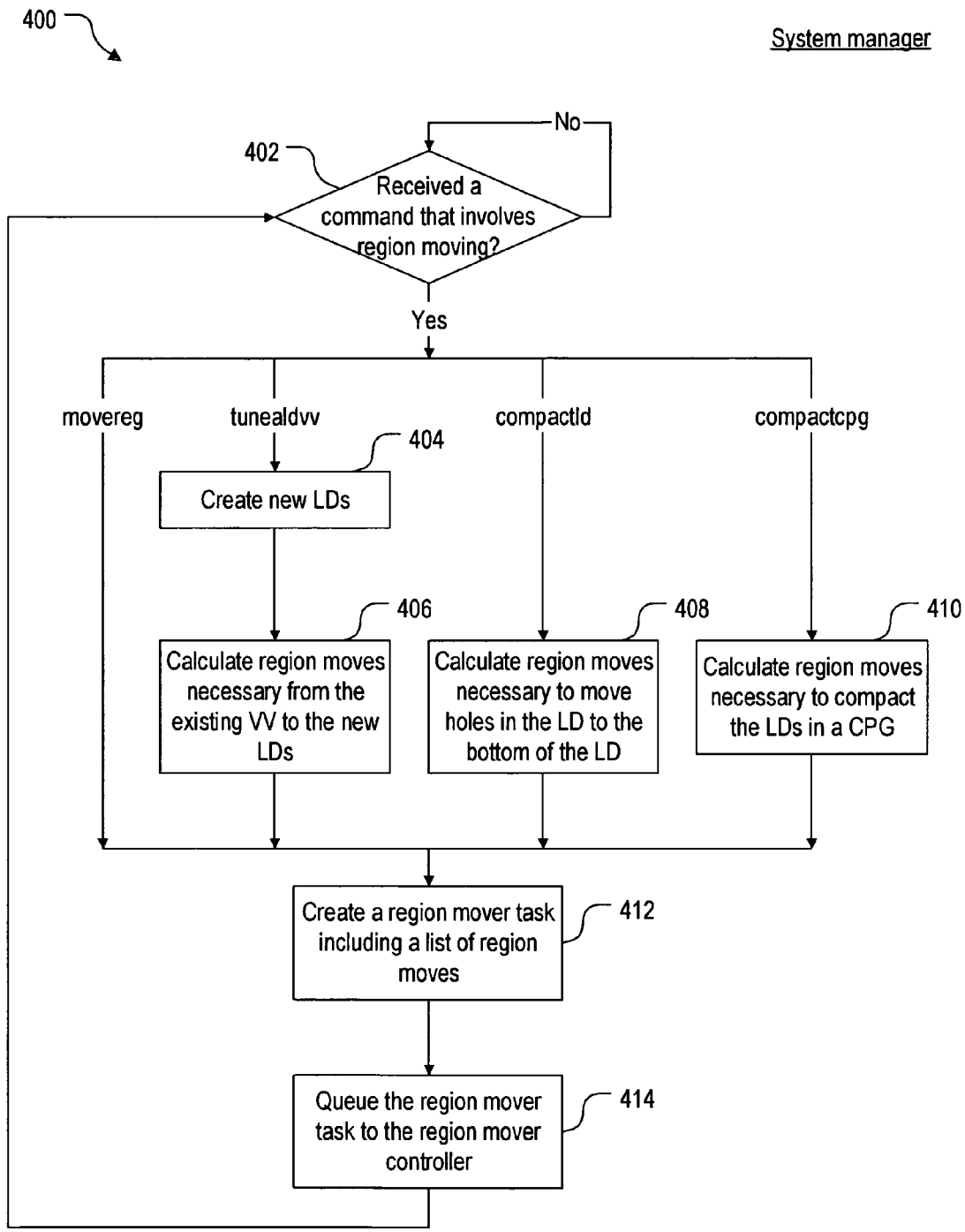
FIG. 4 illustrates a method for a system manager in the data storage system to create a region mover task with the necessary region moves in one embodiment of the invention.

One embodiment of this process is illustrated in the flowchart of FIG. 4 described below.

Figure 5:
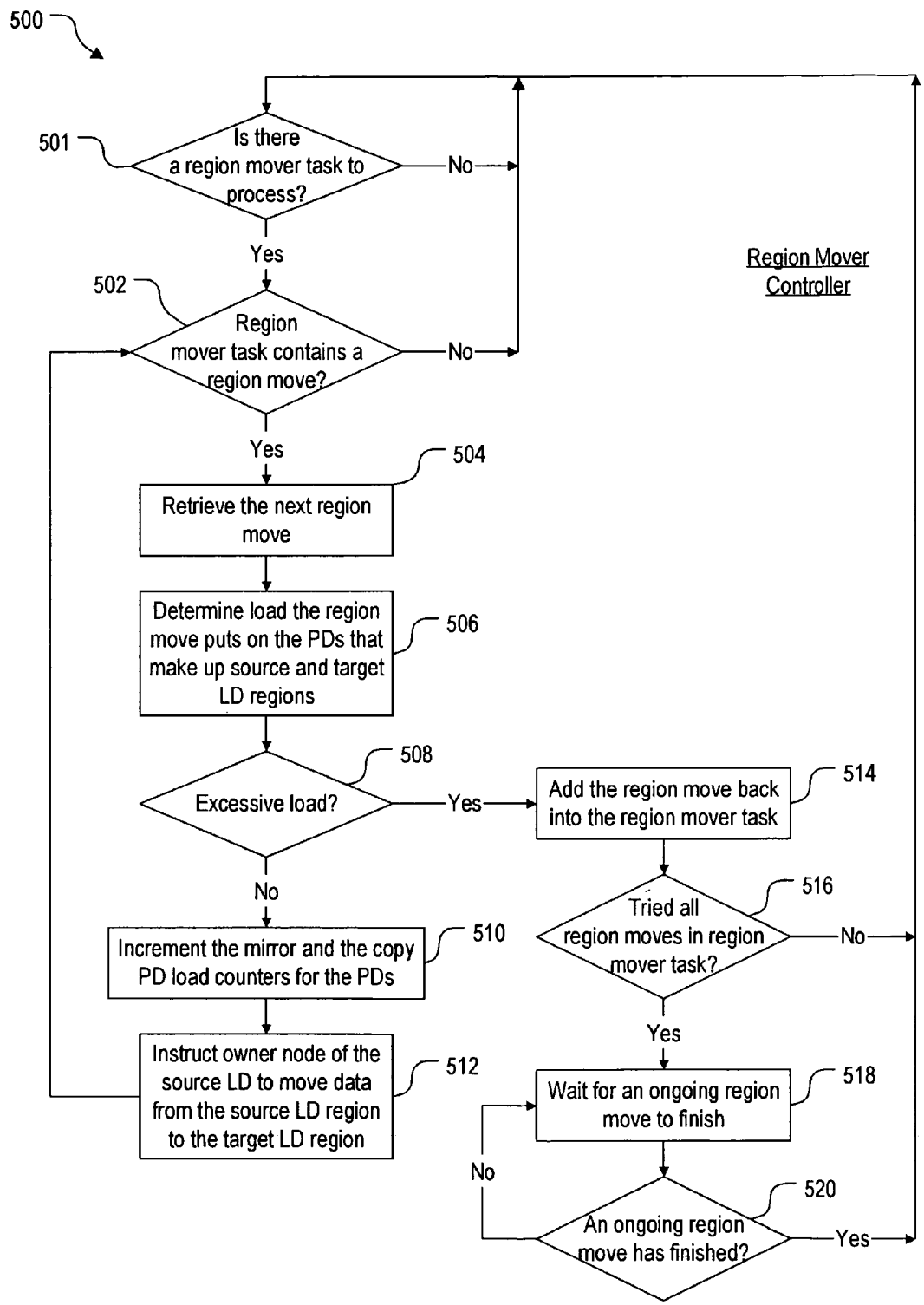
FIG. 5 illustrates a method for a region mover controller in the system manager to process the region moves in a region mover task without adversely impacting host access to the data storage system in one embodiment of the invention.

Region mover controller 330 retrieves each region move from the region mover task and determines the load that region move would put on the physical disk drives involved in the region move. If the load id not excessive so that data storage system 100 remains online to host device 102, region controller 330 instructs a controller node to move the data from a source LD region to a target LD region. If the load is excessive so that data storage system 100 appears offline to host devices 102, region mover controller 330 waits for the load to decrease. Data storage system 100 appears offline when it is unable to respond to a host device request before the host device times out the request and believes that data storage system 100 has malfunctioned. One embodiment of this process is illustrated in the flowchart of FIG. 5 described below.

Figure 6A:
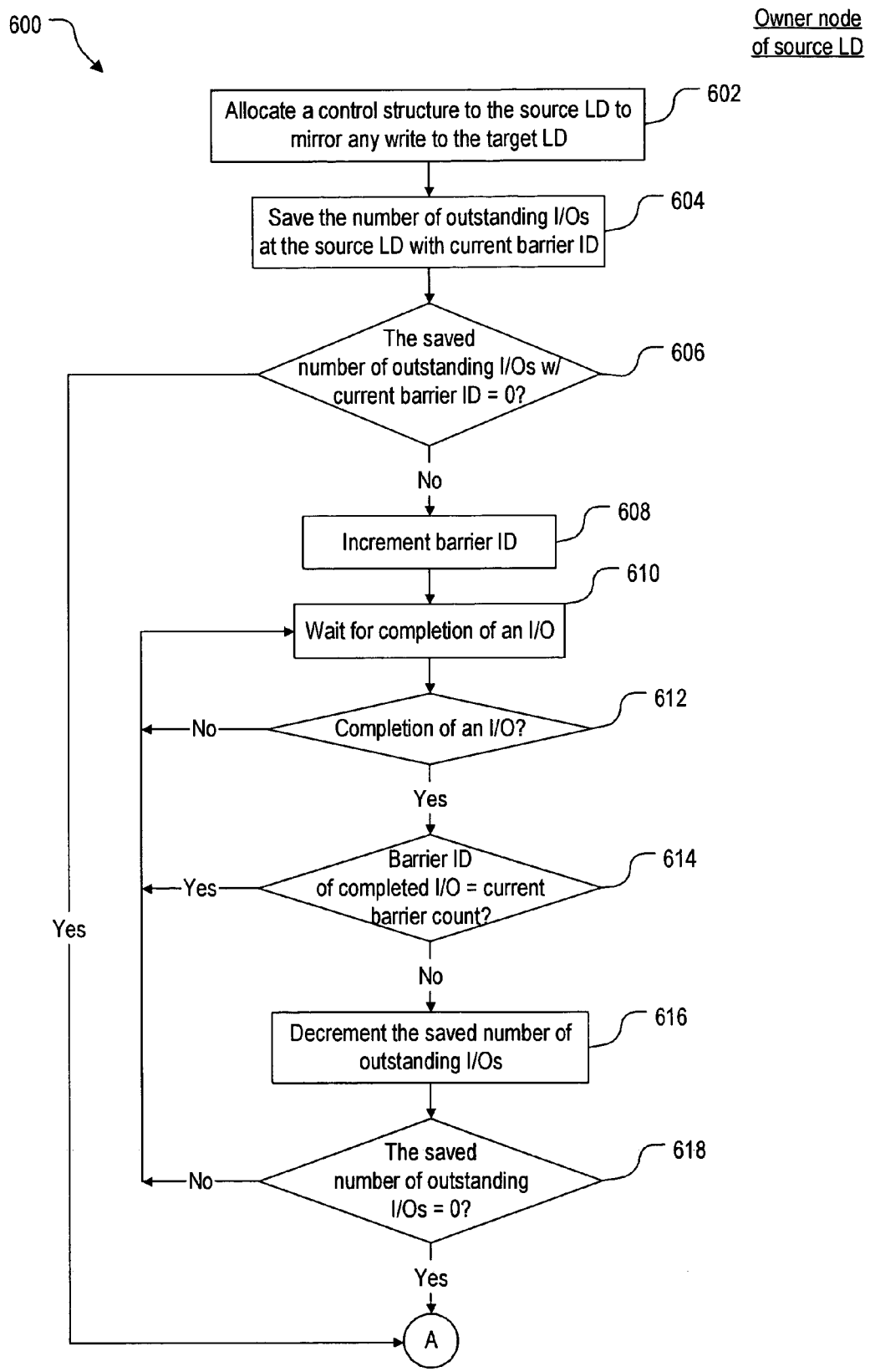
FIGS. 6A and 6B illustrate a method for a node in the data storage system to mirror a source region to a target region in one embodiment of the invention.
Figure 6B:
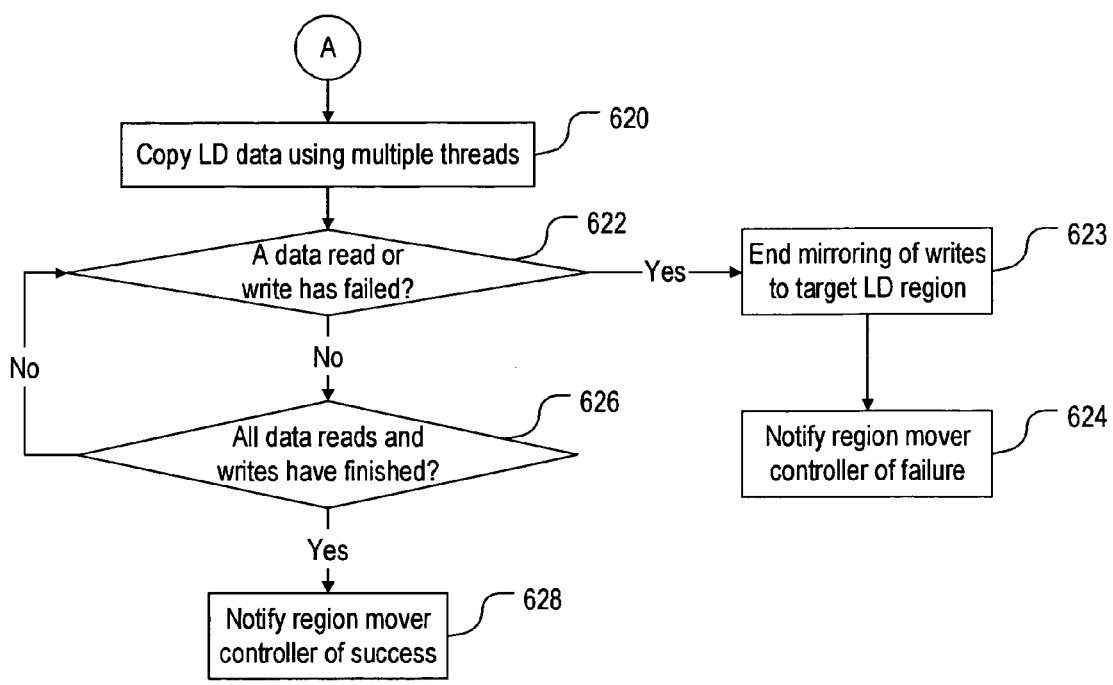

To ensure data consistency between the source and the target LD regions, the controller node first causes all future writes to the source LD region to be mirrored to the target LD region. The controller node then waits for all ongoing writes to the logical disk with the source LD region to complete. Once the ongoing writes have completed, the controller node copies the data from the source LD region to the target LD region. One embodiment of this process is illustrated in the flowchart of FIGS. 6A and 6B described below.

Figure 7:
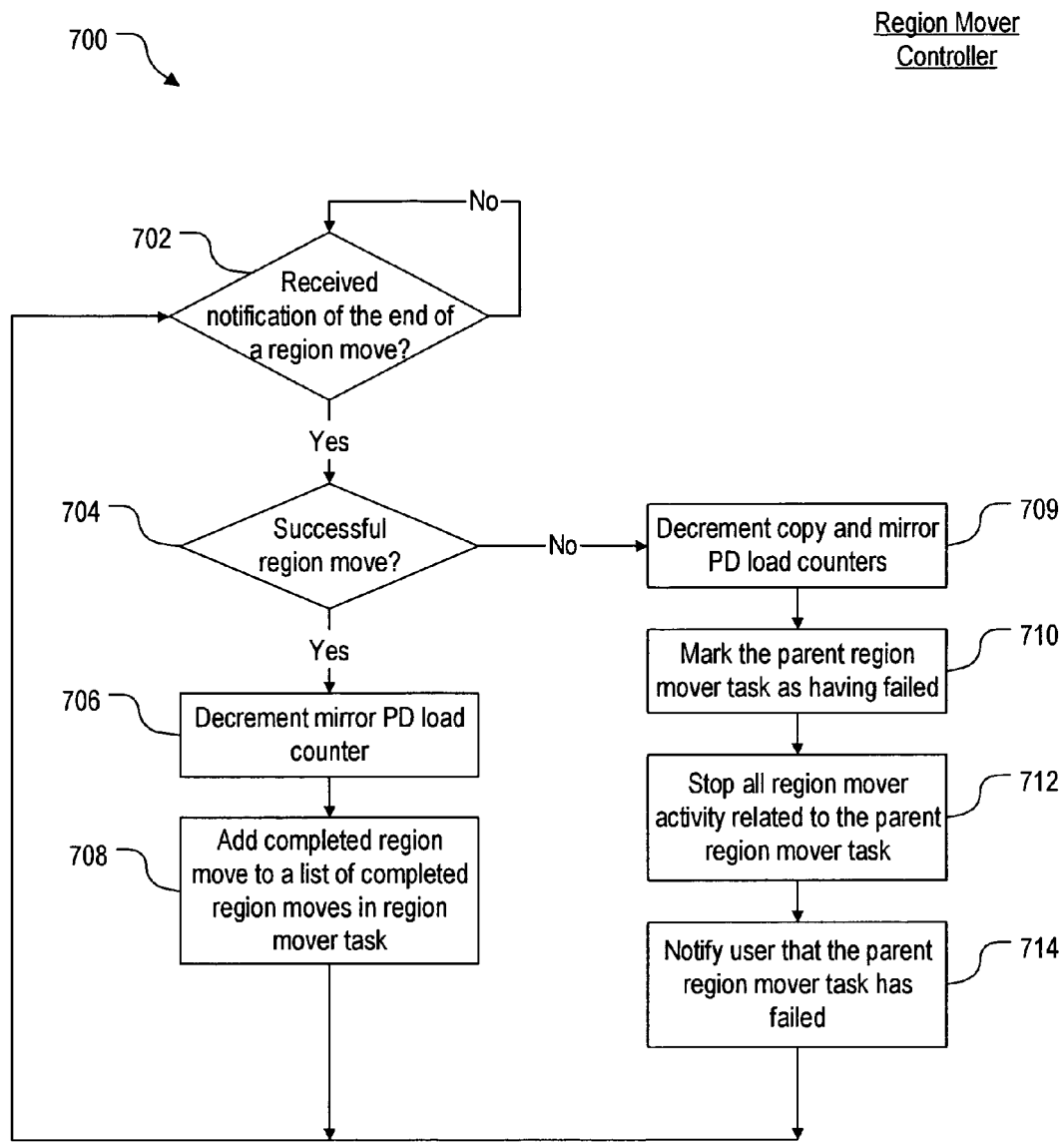
FIG. 7 illustrates a method for the region mover controller to process the completion of the mirroring of the source region to the target region in one embodiment of the invention.

After the region move, region mover controller 330 determines if the region move is successful. If the region move is not successful, region mover controller 330 stops all other region moves in the same region mover task. One embodiment of this process is illustrated in the flowchart of FIG. 7 described below.

Figure 8:
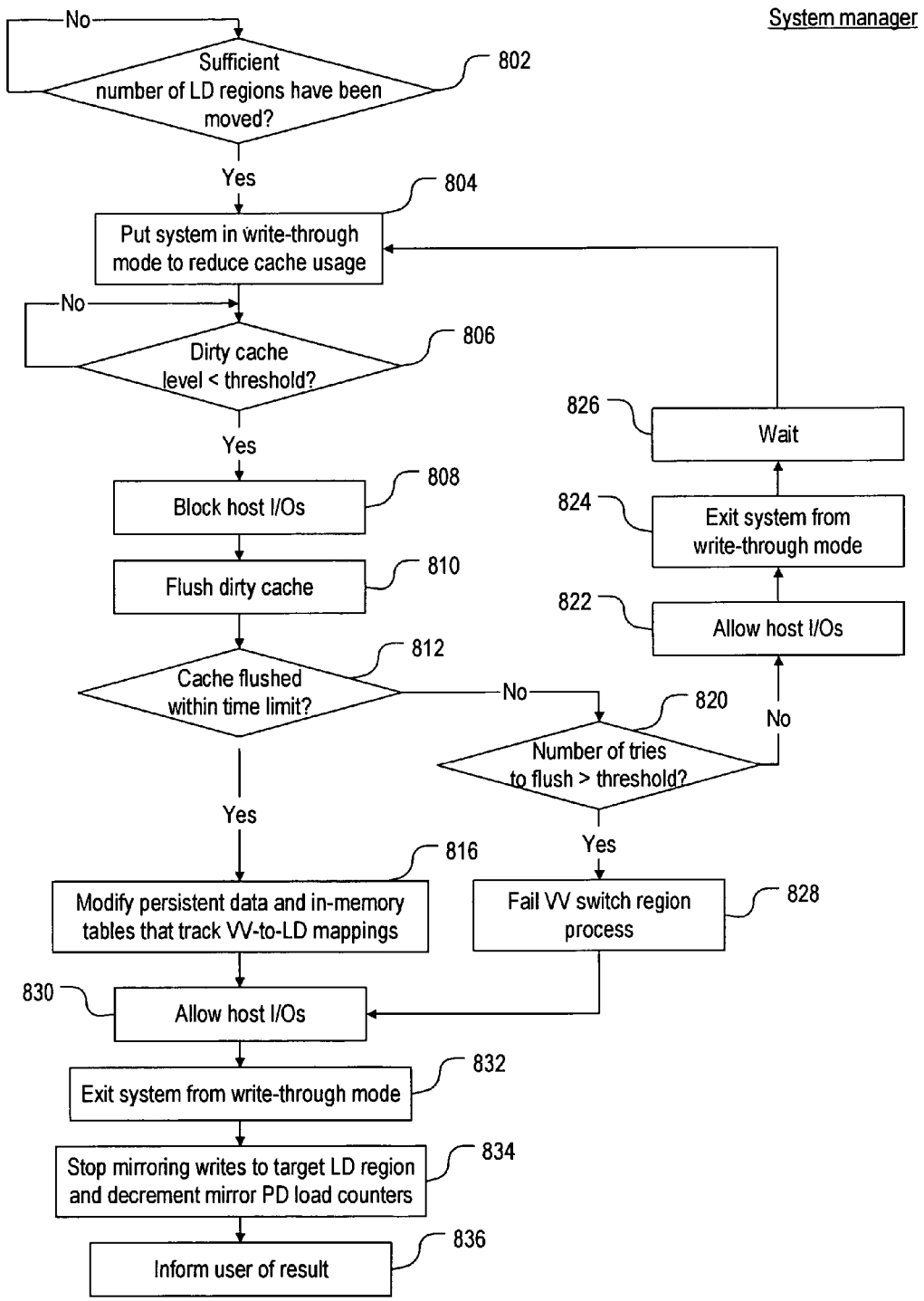
FIG. 8 illustrates a method for the system manager to update the virtual volume to logical disk mapping in one embodiment of the invention.

Once a number of region moves have finished, system manager 304 starts to update the virtual volume to logical disk mapping in data storage system 100. To ensure data consistency, system manager 304 blocks reads and writes to data storage system 100 and then flushes the dirty cache to physical disk drives 106 prior to updating the mapping. If it will take too long to flush the dirty cache so data storage system 100 appears offline to host devices 102, system manager 304 aborts the flushing and retries after some time. After successfully flushing the dirty cache, system manager 304 updates the virtual volume to logical disk mapping so that reads and writes to the virtual volume are directed to the new LD regions. One embodiment of this process is illustrated in the flowchart of FIG. 8 described below.

FIG. 4 illustrates a method 400 for system manager 304 in data storage system 100 to create a region mover task with the necessary region moves in one embodiment of the invention.

In step 402, system manager 304 determines if it has received a command involving one or more region moves. For example, the user can issue one of the commands listed in the following table. Additional details of these commands, including usages and options, are listed in the Appendix.

| Command | Purpose |
| --- | --- |
| movereg | To move data from a source LD region in a source logic disk to a target LD region in a target logical disk. |
| tunealdvv | To change the RAID type, the layout characteristics, and/or the performance characteristics of a virtual volume. |
| compactld | To consolidate space in a logical disk. |

-continued

| Command | Purpose |
| --- | --- |
| compactcpg | To consolidate space in logical disk in a common provisioning group. |

If system manager 304 has received a command involving one or more region moves, then step 402 is followed by one of four paths described below. Otherwise step 402 repeats until system manager 304 receives a command involving one or more region moves.

If the command is "movereg," then step 402 is followed by step 412. This command would identify a set of source LD regions and a set of target LD regions.

If the command is "tunealdvv," then step 402 is followed by steps 404 and 406. In step 404, system manager 304 creates one or more new logical disks with the RAID type, the layout characteristics, and the performance characteristics desired by the user for an existing virtual volume. Step 404 is followed by step 406.

In step 406, system manager 304 determines a list of region moves necessary to move data from the one or more existing logical disks that currently make up the virtual volume to the logical disks that will make up the virtual volume. Note that the logical disks that will make up the virtual volume may be a combination of existing and new logical disks. Each region move identifies a source LD region in a source logical disk and a target LD region in a target logical disk. Step 406 is followed by step 412.

If the command is "compactld," then step 402 is followed by step 408. In step 408, system manager 304 determines a list of region moves necessary to consolidate space in a set of logical disks. To consolidate space in a logical disk, system manager 304 moves LD regions with data into the positions of the empty LD regions (also known as "LD holes"). Effectively, this appears as moving the LD holes to the end of the logical disk. By moving the LD holes to the end of the logical disk, contiguous LD holes can be truncated from the logical disk to free the corresponding chunklets. The freed chunklets can be put back into the buffer pool of chunklets for forming new logical disks.

The LD holes are grouped together at the end of the logical disk because logical disks are identified in data storage system 100 as having a certain length from (0) to (length). By moving the LD holes to the end, the identity of the logical disk can be easily updated by changing the length of the logical disk.

The LD regions have to be grouped together before being freed because data storage system 100 is not able to free up arbitrary amounts of space. This is because writes to the logic disk are performed in across RAID sets in a row. Thus, to free any space from a logical disk, the total space must be freed in the unit row size. This is further described with the help of FIGS. 12 to 15 hereafter.

Figure 12:
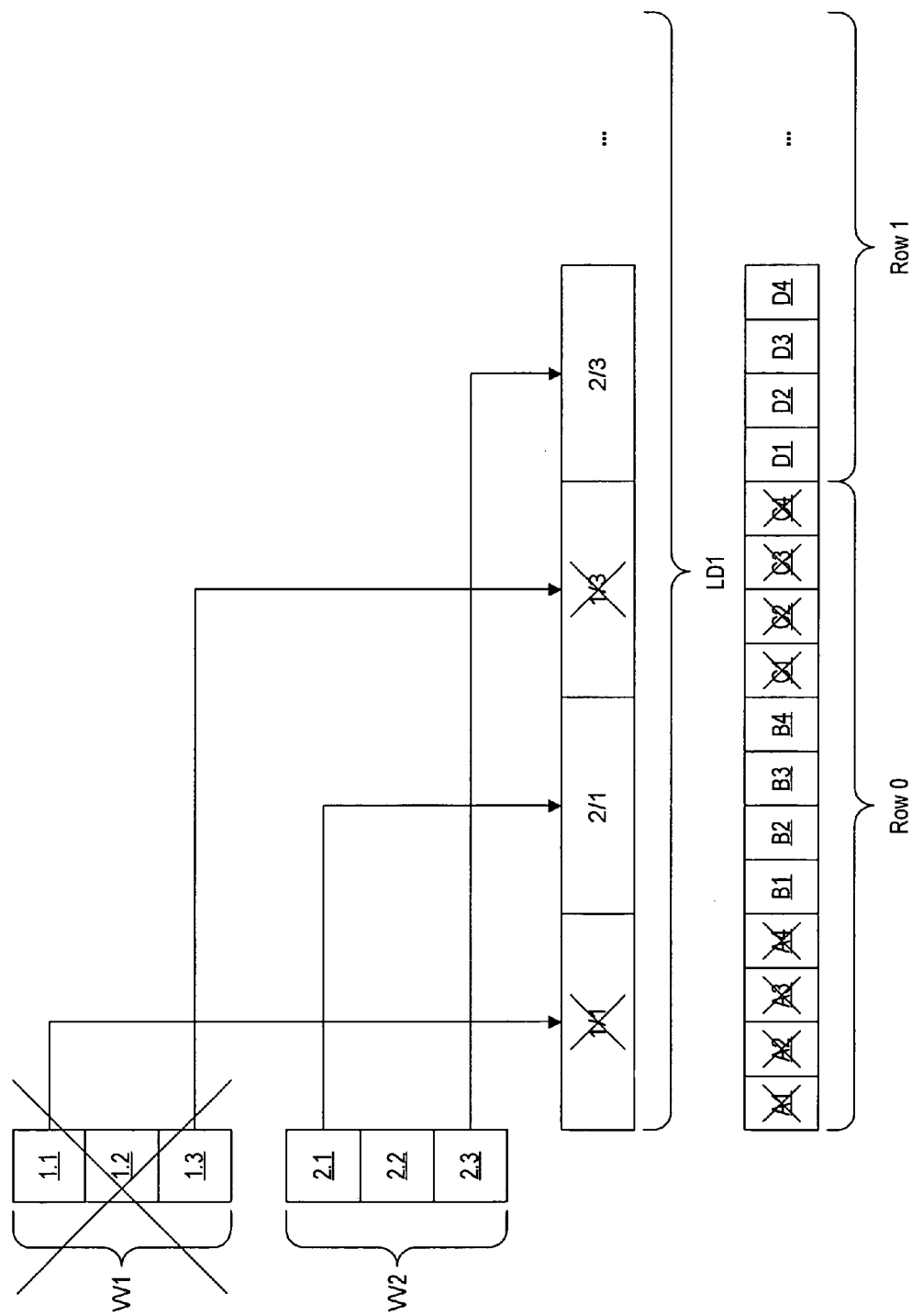
FIG. 12 illustrates a deletion of a virtual volume mapped to the logical disk of FIG. 10A in one embodiment of the invention.

FIG. 12 illustrates the deletion of virtual volume VV1. As can be seen, the deletion of virtual volume VV1 deletes corresponding LD regions 1/1 and 1/3 in logical disk LD1, thereby leaving empty spaces before LD region 2/1 and between LD regions 2/1 and 2/3. Also shown are the corresponding data portions that are deleted from the chunklets.

Figure 13:
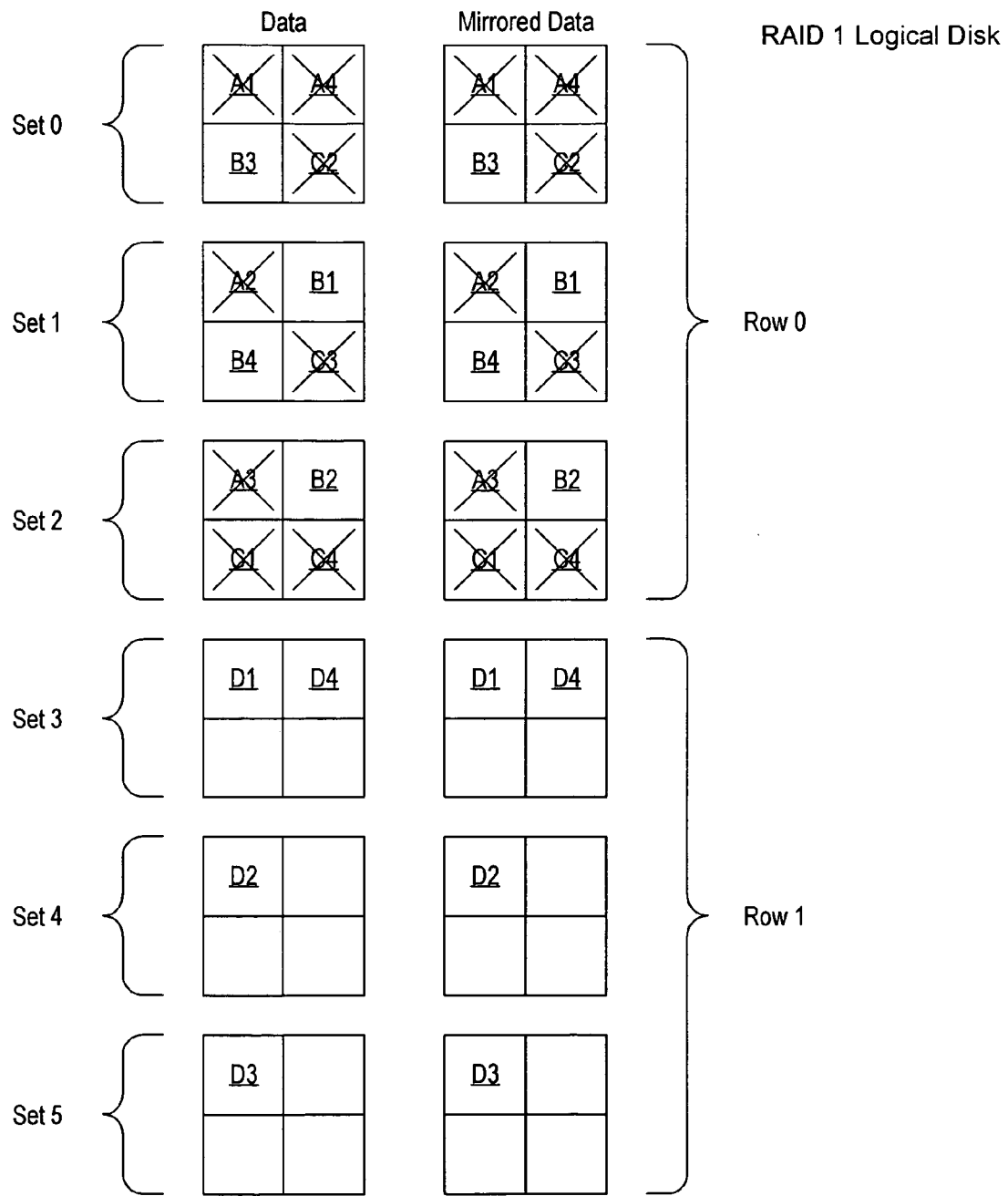
FIGS. 13 and 14 illustrate empty LD regions left behind after the deletion of the virtual volume from the logical disk of FIG. 10A in one embodiment of the invention.
Figure 14:
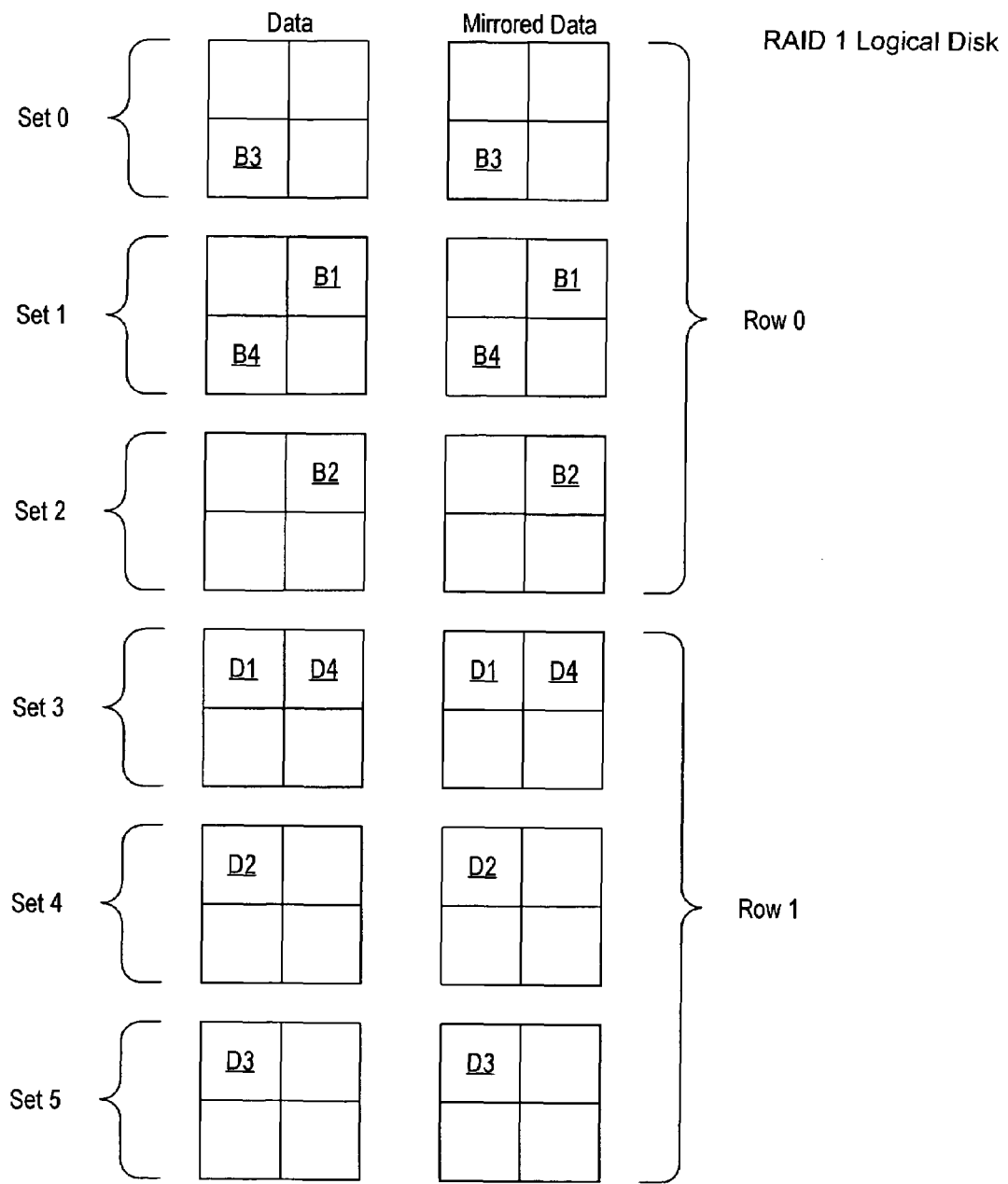

FIGS. 13 and 14 illustrate the deletion of the corresponding data portions in the chunklets. As can be seen, the deletion of the virtual volume VV1 leaves many holes in the chunklets that are difficult to reuse because they are between other data portions. Accordingly, the LD regions with only holes in row 0 are moved to row 1, and the LD regions with data in row 1 are moved to former locations of the LD regions with only holes in row 0.

Figure 15:
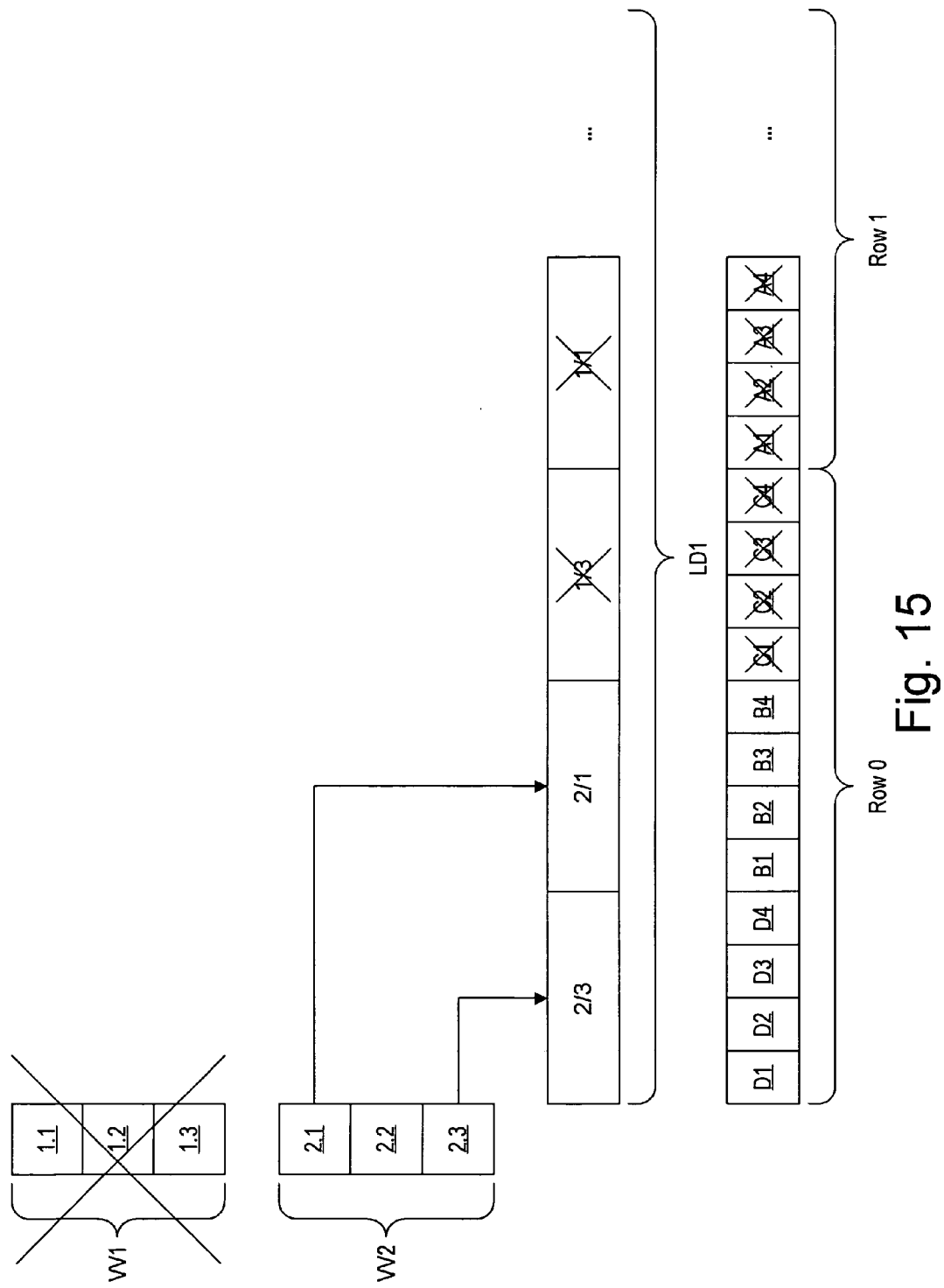
FIGS. 15 and 16 illustrate moving data portions to fill in the empty LD regions in one embodiment of the invention.
Figure 16:
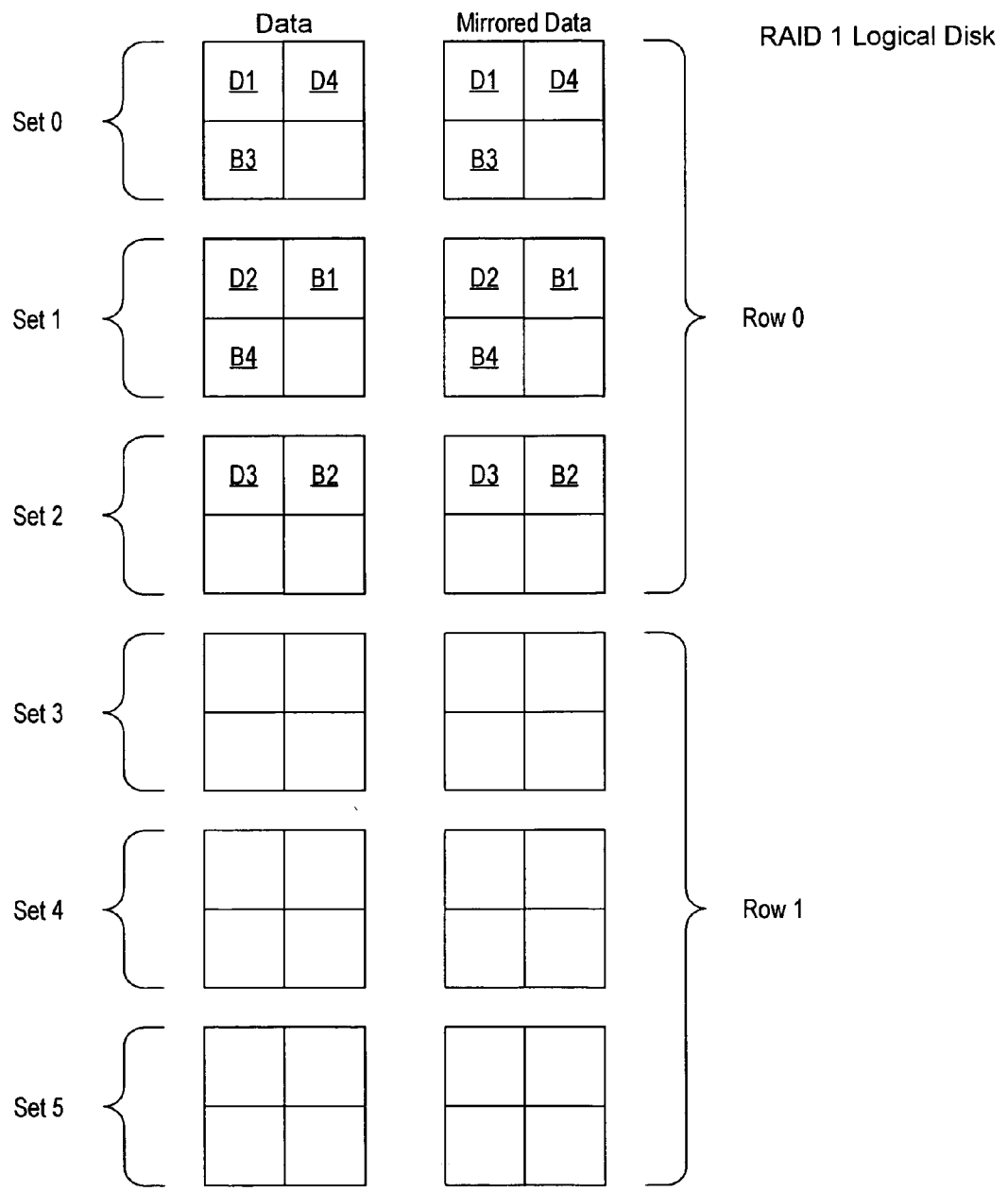

FIGS. 15 and 16 illustrate that move of LD region 2/3 to the former location of LD region 1/1. This causes data portions D1 to D4 to move from row 2 to row 1, thereby freeing up the entire row 2. Thus, row 2 can now be truncated from logical disk LD1 and the chunklets in row 2 can be freed to form other logical disks.

In response to a command option "-cons", system manager 304 moves all the holes to a minimum number of logical disks so the other logical disks are filled with data. If this is not specified, the holes in each logical disk are compacted within that logical disk. Step 408 is followed by step 412.

If the command is "compactcpg," then step 402 is followed by step 410. In step 410, system manager 304 determines a list of region moves necessary to compact the logical disks in a CPG. By default, system manager 304 moves all the holes in each logical disk to the end of the logical disk so the LD holes can be truncated from the logical disk to free the corresponding chunklets. Step 410 is followed by step 412.

In step 412, system manager 304 creates a region mover task with the list of the region moves necessary for the command. Region mover task stores the necessary region moves and additional tasks to be performed by region mover controller 330. One task requires region mover controller 330 to report the completion of individual region moves to help the user keep track of progress. Specific to the "tunealdvv," the "compactld," and the "compactcpg" commands, one task requires region mover controller 330 to delete or truncate the logical disk to free the corresponding chunklets after the successful completion of the commands. Specific to the "tunealdvv" command, one task requires region mover controller 330 to store and delete the restart state so that an interrupted "tunealdvv" command can be restarted. Restart state includes the list of region moves so region mover controller 330 can determine what remaining moves need to be continued to complete the region mover task. One task requires region mover controller 330 to terminate any remaining region moves in response to a user command. Step 412 is followed by step 414.

In step 414, system manager 304 queues the region mover task to region mover controller 330. Step 414 is followed by step 402 and method 400 repeats to process additional commands involving one or more region moves.

FIG. 5 illustrates a method 500 for region mover controller 330 to process the region moves in a region mover task while allowing data storage system 100 to remain online to host devices 102 in one embodiment of the invention.

In step 501, region mover controller 330 determines if there is a region mover task to process. If so, step 501 is followed by step 502. Otherwise step 501 repeats until there is a region mover task to process.

In step 502, region mover controller 330 determines if the region mover task contains a region move to be processed. If so, step 502 is followed by step 504. Otherwise step 502 is followed by step 501 where region mover controller 330 waits for the next region mover task to process.

In step 504, region mover controller 330 retrieves the next region move in the region mover task to be processed. Step 504 is followed by step 506.

In step 506, region mover controller 330 determines the load the region move would put on the physical disk drives that make up the source LD region and the target LD region. Specifically, region mover controller 330 reads the current loads on the physical disk drives from their physical disk ("PD") load counters. In one embodiment, the PD load counters are soft counters that monitor access to the physical disk drives. The PD load counters are kept in the RAMs of the owner controller nodes. Two PD load counters monitor each physical disk drive. A mirror PD load counter monitors the load incurred when writes to a source LD region is mirrored to a target LD region. A copy PD load counter monitors the load incurred when data is copied from the source LD region to the target LD region. Step 506 is followed by step 508.

In step 508, region mover controller 330 determines if the load of the region move would cause data storage system 100 to appear offline to host devices 102. Specifically, region mover controller 330 determines if any of the current loads is greater than a threshold. If the current loads are not excessive for any of the physical disk drives, then step 508 is followed by step 510. Otherwise step 508 is followed by step 514.

In step 510, region mover controller 330 increments (1) the mirror PD load counters at the target physical disk drives in the region move, and (2) the copy PD load counters for the target and source physical disk drives in the region move. Step 510 is followed by step 512.

In step 512, region mover controller 330 instructs the operating system of the owner controller node of the source physical disk drive to move data from the source LD region to the target LD region. Step 512 is followed by step 502 for region mover controller 330 to process another region move in the same region mover task.

In step 514, region mover controller 330 adds the region move back to the region mover task and marks the region move so it knows that it has tried to process this region move. Step 514 is followed by step 516.

In step 516, region mover controller 330 determines if it has tried to process all the region moves in the region mover task, which occurs when all the region moves have been marked. If so, then step 516 is followed by step 518. Otherwise step 516 is followed by step 504 for region mover controller 330 to process another region move in the region mover task.

In step 518, region mover controller 330 waits for an ongoing region move to finish so that data storage system 100 may be under a lesser load. Step 518 is followed by step 520.

In step 520, region mover controller 330 determines if an ongoing region move has finished. If so, then step 520 is followed by step 501 for region mover controller 330 to process a region move in a region mover task. Otherwise steps 518 and 520 repeat until an ongoing region move has finished.

FIGS. 6A and 6B illustrate a method 600 for the operating system of an owner controller node in data storage system 100 to move data from a source LD region to a target LD region in one embodiment of the invention. For simplicity, assume the owner controller node is controller node 104-1.

In step 602 (FIG. 6A), controller node 104-1 allocates a control structure to the source logical disk so that any write to the source LD region is mirrored by controller node 104-1 to the target LD region. This is hereafter referred to as "LD write mirroring." Step 602 is followed by step 604.

Before the control structure is attached to the source logical disk, there may be reads/writes ("I/Os") in progress at the source logical disk. Thus, if controller node 104-1 starts to copy all the data from the source LD region to the target LD region right after step 602, then it is possible to miss the data update in these outstanding I/Os. Thus, steps 604 to 618 allows the outstanding I/Os to finish before controller node 104-1 copies all the data from the source LD region to the target LD region.

In step 604, controller node 104-1 saves the number of outstanding I/Os at the source logical disk. The outstanding I/Os would have the current barrier ID. A barrier ID is a tag attached to an I/O to record when the I/O enters the logical disk layer. Step 604 is followed by step 606.

In step 606, controller node 104-1 determines if there are any outstanding I/Os. Specifically, controller node 104-1 determines if the saved number of outstanding I/Os with the current barrier ID is equal to zero. If so, then step 606 is followed by step 620 (FIG. 6B). Otherwise step 606 is followed by step 608.

In step 608, controller node 104-1 increments the barrier ID. Thus, new I/Os to the source logical disk received after the start of the LD write mirroring will have a new barrier ID while the outstanding I/Os received prior to the start of the LD write mirroring have the old barrier ID.

In step 610, controller node 104-1 waits for an outstanding I/O to complete. Step 610 is followed by step 612.

In step 612, controller node 104-1 determines if an I/O has completed. If so, step 610 is followed by step 614. Otherwise step 612 is followed by step 610, and the above steps repeat until an I/O has completed.

In step 614, controller node 104-1 determines if the completed I/O is a new I/O. Specifically, controller node 104-1 determines if the barrier ID of the completed I/O is equal to the current barrier ID. If so, then step 614 is followed by step 610, and the above steps repeat until an outstanding I/O completes. Otherwise step 614 is followed by step 616.

In step 616, controller node 104-1 decrements the saved number of outstanding I/Os. Step 616 is followed by step 618.

In step 618, controller node 104-1 determines if all the outstanding I/Os have completed. Specifically, controller node 104-1 determines if the saved number of outstanding I/Os is equal to zero. If so, then step 618 is followed by step 620 (FIG. 6B). Otherwise step 618 is followed by step 610 and the above steps repeat until all the outstanding I/Os have completed.

In step 620 (FIG. 6B), controller node 104-1 copies the data from the source LD region to the target LD region. This is hereafter referred to as "LD data copying." In one embodiment, controller node 104-1 uses multiple threads to read and copy the data. To ensure data consistency, the control structure for the source logical disk provides for locking between LD data copying and LD write mirroring so that each waits for a pending process to finish before proceeding. In one embodiment, variable length locking is used so that the size of the data that is locked away to prevent simultaneous access depends on size of that copy or write. Step 620 is followed by step 622.

In step 622, controller node 104-1 determines if any of the reads from the source LD region and the writes to the target LD region during the LD data copying has failed. If so, then step 622 is followed by step 623. Otherwise step 622 is followed by step 626.

In step 623, controller node 104-1 removes the control structure from the source logical disk so that writes to the source LD are no longer mirrored to the target LD. Step 623 is followed by step 624.

In step 624, controller node 104-1 notifies region mover controller 330 that a region move has failed and ends method 600. This corresponds to step 702 (FIG. 7) for region mover controller 330 as described below.

In step 626, controller node 104-1 determines if all the reads from the source LD region and all the writes to the target LD region during the LD data copying have finished. If so, then step 626 is followed by step 628. Otherwise steps 622 and 626 repeat until there is a read or write failure, or until all the reads and writes have successfully completed.

In step 628, controller node 104-1 notifies region mover controller 330 that a region move has successfully completed and ends method 600. This corresponds to step 702 (FIG. 7) for region mover controller 330 as described below.

FIG. 7 illustrates a method 700 for region mover controller 330 to process the completion of the region move in one embodiment of the invention.

In step 702, region mover controller 330 determines if it has received a notification of the end of the region move. Region mover controller 330 can receive a notification from an owner controller node (e.g., controller node 104-1) that the region move was successful or not. Region mover controller 330 can also receive a notification through system manager 304 that the owner controller node itself has failed. System manager 304 can monitor for node failures through primary node-to-node link 108 or the secondary node-to-node link. If region mover controller 330 has received a notification, then step 702 is followed by step 704. Otherwise step 702 repeats until region mover controller 330 receives a notification.

In step 704, region mover controller 330 determines if the region move was successful. If so, then step 704 is followed by step 706. Otherwise step 704 is followed by step 709.

In step 706, region mover controller 330 decrements the copy PD load counters of the source and the target physical disk drives involved in the region move. This is because the LD data copying from the source LD region to the target LD region has completed. Note that at this point the LD write mirroring is still on-going and thus the mirroring PD load counter is not decremented. This is because the mapping of the virtual volume from the old LD regions to the new LD regions is updated in a batch process at a later time and thus writes to the old LD regions must continue to be mirrored to the new LD regions until the mapping has been updated. Step 706 is followed by step 708.

In step 708, region mover controller 330 adds the successfully completed region move to a list of successfully completed region moves in the region mover task. This list of completed region moves will be used later by system manager 304 to update the virtual volume to logical disk mapping of in step 816 (FIG. 8). Step 708 is followed by step 702 where region mover controller 330 waits to process the next completed region move.

In step 709, region mover controller 330 decrements the copy PD load counters at the source and target physical disk drives in the region move, and the mirror PD load counter at the target physical disk drive in the region move. This is because both LD data copying and the LD write mirroring stop when the region move fails. Step 709 is followed by step 710.

In step 710, region mover controller 330 marks the parent region mover task as having failed. This is because the entire region mover task will probably fail for the same reason that this region move has failed. Step 710 is followed by step 712.

In step 712, region mover controller 330 instructs other owner controller nodes to stop processing other region moves in the parent region mover task. Step 712 is followed by step 714.

In step 714, region mover controller 330 notifies the user that the region mover task has failed. Step 714 is followed by step 702 where region mover controller 330 waits to process the next completed region move.

FIG. 8 illustrates a method 800 for system manager 304 to update the virtual volume to logical disk mapping while data storage system 100 remains online to host devices 102 in one embodiment of the invention. Prior to updating the mapping, system manager 304 must first flush the dirty cache to physical disk drives 106 to ensure data consistency. Dirty cache is the cache data that have been modified by host device 102 but not yet written back to physical disk drives 106.

In step 802, system manager 304 determines if a sufficient number of region moves has finished. If a sufficient number of region moves has finished, then step 802 is followed by step 804. Otherwise step 802 repeats until a sufficient number of region moves has finished.

Step 802 sets the point in time when the virtual volume to logical disk mapping is updated. System manager 304 waits for a sufficient number of region moves to finish so it does not have to repeatedly block host I/Os in order to update the mapping. System manager 304 also does not wait for a larger number of region moves to finish because the load caused by the LD write mirroring would become too great as the LD write mirroring continues until the mapping is updated. When the load caused by the LD write mirroring is too great, no additional region moves can be processed by region mover controller 330 at step 508 (FIG. 5) in method 500.

In step 804, system manager 304 puts data storage system 100 in a write-through mode. In the write-through mode, host writes to data storage system 100 are pushed directly to physical disk drives 106. Thus, host writes begin to slow as host devices 102 now wait for the confirmation of the actual write to physical disk drives 106. In contrast, during normal operations, data storage system 100 caches the host writes and generates the confirmation of the writes regardless of the result of the actual writes to physical disk drives 106.

At the same time, system manager 304 begins to flush the dirty cache at a faster rate to physical disk drives 106. The combination of the write-through mode and the faster flushing will gradually reduce the dirty cache level. If the dirty cache level is not first reduced, then the time to flush the entire cache at one time may take too long so that data storage system 100 appears offline to host devices 102. Step 804 is followed by step 806.

In step 806, system manager 304 determines if the dirty cache level is below a threshold. If so, then step 806 is followed by step 808. Otherwise step 806 repeats until the dirty cache level is below the threshold.

In step 808, system manager 304 blocks all host I/Os to data storage system 100. Step 808 is followed by step 810.

In step 810, system manager 304 flushes the dirty cache at all the controller nodes to physical disk drives 106. Step 810 is followed by step 812.

In step 812, system manager 304 determines if the time to flush the dirty cache will be so long that data storage system 100 appears offline to host devices 102. Specifically, system manager 304 determines if the dirty cache is flushed within a time limit. If so, then step 812 is followed by step 816. Otherwise step 812 is followed by step 820.

In step 816, system manager 304 updates the virtual volume to logical disk mapping in memory tables stored in the RAMs of the controller nodes and in persistent tables of content stored on the physical disk drives. Specifically, system manager 304 switches the mapping of the virtual volume from the old LD regions to the new LD regions (i.e., from the source LD regions to the target LD regions) using the list of completed region move generated in step 708 (FIG. 7). Step 816 is followed by step 830.

In step 820, system manager 304 determines if the number of tries to flush the dirty cache is greater than a threshold number of tries. If so, then step 820 is followed by step 828. Otherwise step 820 is followed by step 822.

In step 822, system manager 304 allows host I/Os to resume. Step 822 is followed by step 824.

In step 824, system manager 304 exits data storage system 100 from the write-through mode. Step 824 is followed by step 826.

In step 826, system manager 304 waits before trying to flush the dirty cache again. Step 826 is followed by step 804 and the above steps repeat to flush the dirty cache again.

In step 828, system manager 304 fails the updating of the virtual volume to logical disk mapping. Step 828 is followed by step 830.

In step 830, system manager 304 allows host I/Os to resume. Step 830 is followed by step 832.

In step 832, system manager 304 exits data storage system 100 from the write-through mode. Step 832 is followed by step 834.

In step 834, system manger 304 instructs the appropriate controller nodes to remove the control structures from the source logical disks so that writes to the source LD regions are not mirrored to the target LD regions. System manager 304 also instructs the appropriate controller nodes to decrement the mirror PD load counters for the target physical disk drives involved in the region moves. Step 834 is followed by step 836.

In step 836, system manager 304 informs the user of the successful or unsuccessful result of the region moves and ends method 800. If the result is unsuccessful, the user may again instruct system manger 304 to move the regions. Note that the failure of the VV switching also fails all region moves in the list of completed region moves to ensure data consistency. Furthermore, if all the region moves in a region mover task have completed, then system manager 304 also performs any other tasks enumerated in the region mover task in step 412 (FIG. 4), including truncating or deleting the logical disks involved in the "compactld" an "compactcpg" commands.

Various other adaptations and combinations of features of the embodiments disclosed are within the scope of the invention. Numerous embodiments are encompassed by the following claims.

APPENDIX

```
movereg - Move regions between LDs
usage: movereg [options] sldname:soffmb:dldname:doffmb ...
where [options] are
-nowait              Do not wait for the moves to complete. If this option
                     is specified, the command prints the taskid of the
                     move_region task. The showtask command can be used to
                     see the status of the task.
                     If this option is not specified the
                     command polls for the task status and returns only after
                     the task is completed or terminates due to an error.
-f                   Do not ask for confirmation.
and
sldname              LD name of a source region
sldoffmb             Offset in MB of the start of a source region
dldname              LD name of a destination region
dldoffmb             Offset in MB of the destination of a source region
Notes:
Without the -f flag, the command will prompt for confirmation.
For this command MB = 1048576 bytes.
returns:
tunealdvv -          Change the layout of a virtual volume.
usage:
tunealdvv            [-f] [tune_options] [options] vvname
tunealdvv -restart   [-f] [tune_options] vvname
tunealdvv -rollback  [-f] [tune_options] vvname
tunealdvv -cleanupstate   [-f] vvname
tunealdvv -cpg cpgname    [-f] [tune_options] [options] vvname
where
-f                   Do not ask for confirmation
-restart             Restart a tunealdvv call that was previously
                     interrupted because of component failure, or because
                     of user initiated cancellation.
-rollback            Rollback a tunealdvv call that was previously interrupted.
-cleanupstate        Clean up state from a tunealdvv call that was previously
                     interrupted.
-cpg <cpgname>       The name of the cpg to which the sd space is moved.
                     When sd space is tuned, the only permitted [option] is
                     -cnt.
                     If the '-cpg' option is specified, only the SD space of a
                     volume is tuned. If this option is not specified, only
                     the USR space of a volume is tuned.
and [tune_options] are
-dr                  Dry run
-keepld              Don't delete unused space at the end of this set of
                     region moves. The default is to reclaim unused space
                     if the moves complete successfully.
and [options] are
-templ <tname>       Use the options defined in template "tname".
                     The template is created using the createtemplate
                     command. Options specified in the template are
                     read-only or read-write. The read-write options may
                     be overridden with new options at creation time
                     but read-only options may not be overridden at
                     creation time.
```

APPENDIX-continued

| | |
|---|---|
| | Options not explicitly specified in the template take their default values, and all of these options are either read-only or read-write (using the -nro or -nrw options of the createtemplate command). Note that the sizing options from the template are ignored. This command does not change the size of the VV it acts on. |
| -t <raid_type> | Specify the raid type: r0 or r1 or r5. The default is r1. |
| -ssz <size_nbch> | Specify the set size in number of chunklets. The default set size is 2 for RAID-1, 4 for RAID-5. If not specified, the default set size is used by the "showspace" command to estimate space available. |
| -rs <size> | Specify the number of sets in a row. Default is no limit. |
| -ss <sizeKB> | Step size specified in KB. Can take any value in the range 32 to 512. The step size should be a power of 2 and a multiple of 32. The default is 256 KB for RAID-0 and RAID-1 and 128 KB for RAID-5. |
| -ha cage\|mag | RAID-1 or RAID-5 can support a failure of one cage or mag. For RAID-1 and RAID-5 the default for user, snap admin and snap data areas are cage. For RAID-0 the default for the snap admin area is cage. |
| -ch first\|last | Chunklet location preference. Allows chunklets to be placed physically close to other chunklets with the same location preference. "first" - attempt to use the lowest numbered available chunklets. "last" - attempt to use the highest numbered available chunklets. The default value is "first". |
| -p <pattern> | Pattern for candidate disks. The default is all disks (see below for description of <pattern>). If the -p option is specified multiple times each instance of <pattern> adds additional candidate disks that match that pattern. |
| -wait <ts> | Will wait for at most ts seconds for the chunklets to initialize. The default is computed automatically |
| -dr | Dry run |
| -verbose <on\|off> | Enable/Disable verbose output The default is off. |
| -cnt <nb of vv> | Specify the number of identical VVs to tune using an integer from 1 to 999. The default will tune one VV. |
| A <pattern> is one or more of the following | |
| -nd <item> | Disks must have their primary path on a node number in the range specified by <item> |
| -st <item> | Disks must have their primary path on a PCI slot number in the range specified by <item> |
| -pt <item> | Disks must have their primary path on a port number in the range specified by <item> |
| -cg <item> | Disks must be in the cage number in the range specified by <item> |
| -mg <item> | Disks must be in the magazine number in the range specified by <item> (The "1." or "0." that indicates the side of cage is omitted). |
| -pn <item> | Disks must be in the position within a magazine in the range specified by <item> |
| -dk <item> | Disks must have ids in the range specified by <item> |
| -tc_gt <num> | The total number of chunklets in the disk must be greater than <num>. |
| -tc_lt <num> | The total number of chunklets in the disk must be less than <num>. |
| -fc_gt <num> | The sum of free or initializing chunklets in the disk must be greater than <num>. |
| -fc_lt <num> | The sum of free or initializing chunklets in the disk must be less than <num>. |
| -devid <id>,<id>,.. | Disks must have deviceid strings that match one of the specified list of ids. Device ids are shown in the "Device id" column the showpd -i command. |
| -devtype <devtype> | Disks must have a device type string that matches the specified device type. Device types are shown in the "Dev_Type" column of the showpd -i command. |

APPENDIX-continued

```
An item is:
<nb>                    nb is an integer
<item>,<item>           an item is a list of items
<nb>-<nb>               an item is a range of integers
```
Disks that satisfy all of the specified characteristics are used.
For example -p -fc__gt 60 -fc__lt 230 -nd 2 specifies all the disks that have
greater than 60 and less than 230 free chunklets and that are connected
to node 2 through their primary path.
and
```
vvname                  Virtual volume name of the existing volume
```
Note:
When canceling a tunealdvv task, the canceltask command may return before a
cancellation is complete. Thus, resources reserved for the task may not be
immediately available. This can prevent actions like restarting the canceled
tunealdvv task. Scripts should use the waittask command in order to ensure
orderly completion of the tunealdvv cancellation prior to taking other actions.
compactld - Consolidate space in logical disks.
usage: compactld [options] <ldname or pattern> ...
where [options] are
```
-pat                    Treat the list of <ldname or pattern> ... as glob-style
                        (shell-style) patterns and compact all the LDs that
                        match any of those patterns. (see help on sub, globpat).
-nowait                 Do not wait for the moves to complete. If this option
                        is specified, the command prints the task identifier of
                        the move_region task in the format tid where
                        tid is the task id. The showtask command can be used to
                        see the status of the task. If this option is not
                        specified the command polls for the task status and
                        returns only after the task is completed or terminates
                        due to an error.
-cons                   Consolidate regions into as few LDs as possible.
                        If this option is not specified, regions in each LD
                        are compacted within the same LD.
-dr                     Dryrun. Do not actually perform the tasks.
-keepld                 After the LDs have been compacted, do not remove any
                        free space that results. Without this option, any empty
                        LDs will be removed, and LDs with some free space will
                        be truncated.
-taskname <taskname>    Specify a name for the task. If not specified a default
                        name is chosen.
-f                      Do not ask for confirmation before compacting the LD.
                        Unless the -f option is specified, the command asks
                        for confirmation before compacting each LD.
```
compactcpg - Consolidate space in common provisioning groups.
usage: compactcpg [options] <cpgname or pattern> ...
where [options] are
```
-pat                    Treat the list of <cpgname or pattern> ... as glob-style
                        (shell-style) patterns and compact all the CPGs that
                        match any of those patterns. (see help on sub, globpat).
-keepld                 Do not remove unused LDs after consolidating the space.
-trimonly               Only remove unused LD space, don't perform any region
                        moves.
-nowait                 Do not wait for the moves to complete. If this option
                        is specified, the command prints the task identifier of
                        the created task(s). The showtask command can be used to
                        see the status of the task(s). If this option is not
                        specified, the command polls for the task status and
                        returns only after the task is completed or terminates
                        due to an error.
-dr                     Dryrun. Do not actually perform the tasks.
-f                      Do not ask for confirmation before compacting the LD.
                        Unless the -f option is specified, the command asks
                        for confirmation before compacting each CPG.
```
createaldvv - Create a virtual volume and its underlying logical disks
with automatic layout.
SYNTAX: createaldvv [options] wname size[g|G]
where [options] are
```
-templ <tname>          Use the options defined in template "tname".
                        The template is created using the createtemplate
                        command. Options specified in the template are
                        read-only or read-write. The read-write options may
                        be overridden with new options at creation time
                        but read-only options may not be overridden at
                        creation time.
                        Options not explicitly specified in the template
                        take their default values, and all of these options
                        are either read-only or read-write (using the -nro
                        or -nrw options of the createtemplate command).
```

APPENDIX-continued

| | |
|---|---|
| | If not included, the -size and -cpg options are automatically treated as read-write even if the other unincluded properties are marked read-only. |
| -t <raid_type> | Specify the raid type: r0 or r1 or r5. The default is r1. |
| -ssz <size_nbch> | Specify the set size in number of chunklets. The default set size is 2 for RAID-1, 4 for RAID-5. If not specified, the default set size is used by the "showspace" command to estimate space available. |
| -rs <size> | Specify the number of sets in a row. Default is no limit. |
| -ss <sizeKB> | Step size specified in KB. Can take any value in the range 32 to 512. The step size should be a power of 2 and a multiple of 32. The default is 256 KB for RAID-0 and RAID-1 and 128 KB for RAID-5. |
| -ha cage\|mag | RAID-1 or RAID-5 can support a failure of one cage or mag. For RAID-1 and RAID-5 the default for user, snap admin and snap data areas are cage. For RAID-0 the default for the snap admin area is cage. |
| -ch first\|last | Chunklet location preference. Allows chunklets to be placed physically close to other chunklets with the same location preference. "first" - attempt to use the lowest numbered available chunklets. "last" - attempt to use the highest numbered available chunklets. The default value is "first". |
| -p <pattern> | Pattern for candidate disks. The default is all disks (see below for description of <pattern>). If the -p option is specified multiple times each instance of <pattern> adds additional candidate disks that match that pattern. |
| -f | Do not ask for confirmation before creating a RAID-0 volume. |
| -wait <ts> | Will wait for at most ts seconds for the chunklets to initialize. The default is computed automatically |
| -dr | Dry run |
| -verbose <on\|off> | Enable/Disable verbose output The default is off. |
| -cnt <nb of vv> | Specify the number of identical VVs to create using an integer from 1 to 999. The default will create one VV. |
| -i <vv id> | Specify the VV id. The default will be the next available VV id. |
| -szs <size>[g\|G] | Size for the snap volume in MB (maximum 1073741568). The default value is not set. The optional g or G parameter (no whitespace before g or G) modifies the unit to Gigabyte. If -cpg is specified, this value should be 0. |
| -pct <prc> | Size for the snap vol in percentage of usr vol Only one of -szs or -pct can be set. The default is 0. If -cpg is specified, this value should be 0. |
| -cpg <cpgname> | Provision the SD and SA space from the CPG <cpgname> |
| -aw <percent> | Allocation warning. Generate an warning alert when the SD space of the VV exceeds <percent> of the VV size. |
| -al <percent> | Allocation limit. The SD space of the VV is prevented from growing beyond <percent> of the VV size. |
| -pol <pol>[,<pol> ...] | Define volume policy (see below) |
| The -pol option allows you to set the policy of a VV. | |
| The available policies are: | |
| stale_ss | Allow stale (invalid) snapshots. This means that failures to update snapshot data will not affect the write to the base volume, but the snapshot will then be considered invalid. This is the default setting for all volumes. |
| no_stale_ss | Do not allow stale (invalid) snapshots. This means that failures to update snapshot data will be considered a failure to write to the base volume as well. |
| A <pattern> is one or more of the following | |
| -nd <item> | Disks must have their primary path on a node number in the range specified by <item> |
| -st <item> | Disks must have their primary path on a PCI slot number in the range specified by <item> |

APPENDIX-continued

| | |
|---|---|
| -pt <item> | Disks must have their primary path on a port number in the range specified by <item> |
| -cg <item> | Disks must be in the cage number in the range specified by <item> |
| -mg <item> | Disks must be in the magazine number in the range specified by <item> (The "1." or "0." that indicates the side of cage is omitted). |
| -pn <item> | Disks must be in the position within a magazine in the range specified by <item> |
| -dk <item> | Disks must have ids in the range specified by <item> |
| -tc__gt <num> | The total number of chunklets in the disk must be greater than <num>. |
| -tc__lt <num> | The total number of chunklets in the disk must be less than <num>. |
| -fc__gt <num> | The sum of free or initializing chunklets in the disk must be greater than <num>. |
| -fc__lt <num> | The sum of free or initializing chunklets in the disk must be less than <num>. |
| -devid <id>,<id>, ... | Disks must have deviceid strings that match one of the specified list of ids. Device ids are shown in the "Device id" column the showpd -i command. |
| -devtype <devtype> | Disks must have a device type string that matches the specified device type. Device types are shown in the "Dev_Type" column of the showpd -i command. |
| An item is: | |
| <nb> | nb is an integer |
| <item>,<item> | an item is a list of items |
| <nb>-<nb> | an item is a range of integers |

Disks that satisfy all of the specified characteristics are used.
For example -p -fc__gt 60 -fc__lt 230 -nd 2 specifies all the disks that have greater than 60 and less than 230 free chunklets and that are connected to node 2 through their primary path.
and

| | |
|---|---|
| vvname | Virtual volume name up to 19 characters in length |
| size[g\|G] | Size for the user volume in MB (maximum of 2096128 MB). The size should be an integer. If the value is followed by a g or G, (no whitespace before g or G) the size is in GB. If the size is to be taken from a template, this field should be "-". |

For this command KB = 1024 bytes, MB = 1048576 bytes, GB = 1073741824 bytes.

What is claimed is:

1. A method for a system manager in a data storage system to move data from source logical disk (LD) regions to target LD regions (hereafter "the region moves") while the data storage system remains online to a host device, the data storage system providing a virtual volume to the host device, the virtual volume being initially mapped to the source LD regions in one or more logical disks, the source LD regions being mapped to physical storage regions in one or more physical storage devices, the method comprising:
   generating a task comprising a list of the region moves to process for transferring data from the source LD regions to the target LD regions; and,
   processing the task, comprising:
      selecting a region move from the task, the region move comprises a transfer of data from a source LD region to a target LD region;
      determining if the region move would create excessive load on the corresponding physical storage devices so that the data storage system appears offline to the host device; and
      when the region move would create excessive load:
         determining if there is at least one region move in the task that has not been selected before;
         when there is at least one region move in the task that has not been selected before, repeating said processing for a next region move in the task; and
         when there is not at least one region move in the task that has not been selected before, waiting for another region move from the task that is currently being performed to finish and then repeating said processing for the next region move in the task.

2. The method of claim 1, further comprising:
   when the region move would not create excessive load, performing the region move by:
   causing writes to the source LD region to be mirrored to the target LD region;
   causing data in the source LD region to be copied to the target LD region; and
   updating a mapping of the virtual volume from the source LD region to the target LD region.

3. The method of claim 2, wherein:
   said determining if the region move would create excessive load on the corresponding physical storage devices further comprises determining if one or more load values from one or more load counters for the physical storage devices are greater than one or more thresholds; and
   the method further comprises incrementing the one or more load counters when the region move would not create excessive load.

4. The method of claim 3, wherein the one or more load counters comprises:
   a mirror load counter for a first physical storage device, the first physical storage device storing the target LD region, the mirror load counter tracking a first load caused by the writes to the source LD region being mirrored to the target LD region;

a first copy load counter for the first physical storage device, the first copy load counter tracking a second load to the first physical storage device caused by the data in the source LD region being copied to the target LD region; and a second copy load counter for a second physical storage device, the second physical storage device storing the source LD region, the second copy load counter tracking a third load to the second physical storage device caused by the data in the source LD region being copied to the target LD region.

5. The method of claim 4, after said causing the data in the source LD to be copied to the target LD region, further comprising:

determining if the data in the source LD region has been successfully copied to the target LD region; and when the data in the source LD region has been successfully copied to the target LD region, decrementing the first and the second copy load counters.

6. The method of claim 5, further comprising:

when the data in the source LD region has not been successfully copied to the target LD region:

decrementing the mirror load counter, the first copy load counter, and the second copy load counter;

stopping other region moves that are in the task; and notifying a user that the task has failed.

7. The method of claim 4, after said causing the data in the source LD region to be copied to the target LD region and prior to said updating a mapping of the virtual volume to the LD regions, further comprising:

enabling a write-through mode where writes are sent directly to the physical storage devices;

blocking reads and writes to the data storage system;

flushing dirty cache to the physical storage devices;

determining if said flushing the dirty cache exceeds a time limit so the data storage system appears offline to the host device;

when said flushing the dirty cache does not exceed the time limit:

performing said updating a mapping;

resuming the reads and writes to the data storage system.

8. The method of claim 7, further comprising:

when said flushing the dirty cache exceeds the time limit:

determining if a number of tries to flush the dirty cache exceeds a threshold reference;

when the number of tries to flush the dirty cache exceeds the threshold reference:

resuming the reads and writes to the data storage system;

informing a user that the region move has failed;

when the number of tries to flush the dirty cache is below the threshold reference:

resuming the reads and writes to the data storage system;

waiting before repeating above steps starting from said blocking reads and writes to the data storage system.

9. The method of claim 7, after said causing the data in the source LD to be copied to the target LD region, further comprising:

determining if there is a sufficient number of completed region moves;

when there is the sufficient number of completed region moves:

putting the data storage system in a write-through mode where writes are sent directly to the physical storage devices without caching;

after the dirty cache is reduced, performing steps from said blocking reads and writes to the data storage system to said resuming the reads and write to the data storage system;

after said resuming the reads and writes to the data storage system, exiting the data storage system from the write-through mode; and decrementing the mirror load counter.

10. The method of claim 2, after said causing writes to the source LD region to be mirrored to the target LD region and prior to said causing the data in the source LD to be copied to the target LD region, further comprising:

saving a number of outstanding writes to a source logical disk of the source LD region, the outstanding writes beginning prior to said causing writes to the source LD region to be mirrored to the target LD region;

incrementing a barrier ID so that the outstanding writes have an old barrier ID and new writes to the source logical disk have a new barrier ID;

determining if a completed write to the source logical disk has the old barrier ID or the new barrier ID;

when the completed write has the old barrier ID:

decrementing the saved number of the outstanding writes;

determining if the saved number of the outstanding writes is zero;

when the saved number of the outstanding writes is zero, performing above steps staffing from said causing the data in the source LD to be copied to the target LD region;

when the saved number of the outstanding writes is not zero, repeating above steps staffing from said determining if a completed write to the source logical disk has the old barrier ID or the new barrier ID.

11. A method for a system manager in a data storage system to non-disruptively move data from source logical disk (LD) regions to target LD regions (hereafter "the region moves") while the data storage system remains online to a host device, the data storage system providing a virtual volume to the host device, the virtual volume being initially mapped to the source LD regions in one or more logical disks, the source LD regions being mapped to physical storage regions in one or more physical storage devices, the method comprising:

generating a task comprising a list of region moves to process for transferring data from the source LD regions to the target LD regions;

processing the task;

enabling a write-through mode where writes are sent directly to the physical storage devices without caching in order to reduce dirty cache;

determining if an amount of data in the dirty cache has become less than a threshold after said enabling a write-through mode; and when the dirty cache becomes less than the threshold:

temporarily blocking reads and writes from the host device to the data storage system;

flushing the dirty cache to the physical storage devices;

determining if said flushing the dirty cache exceeds a time limit; and when said flushing the dirty cache is below the time limit:

updating a mapping of the virtual volume from the source LD regions to the target LD regions; and resuming the reads and writes from the host device to the data storage system.

12. The method of claim 11, further comprising:
after said processing the task and prior to said enabling a write-through mode, determining if there is a sufficient number of completed region moves, wherein said enabling a write-through mode occurs only when there is the sufficient number of completed region moves; and
after said resuming the reads and writes to the data storage system, exiting the data storage system from the write-through mode.

13. The method of claim 12, further comprising:
when said flushing the dirty cache exceeds the time limit:
determining if a number of tries to flush the dirty cache exceeds a threshold reference;
when the number of tries to flush the dirty cache exceeds the threshold reference:
resuming the reads and writes from the host device to the data storage system;
informing a user of that the region moves have failed;
when the number of tries to flush the dirty cache is below the threshold reference:
resuming the reads and writes from the host device to the data storage system;
waiting before repeating above steps starting from said putting the data storage system in the write-through mode.

14. An apparatus for managing a data storage system, the apparatus comprising:
a plurality of physical storage devices; and
a system manager configured to:
provide a virtual volume composed of a plurality of logical disk (LD) regions associated with physical storage regions of the physical storage devices;
generate a task comprising a list of region moves to process for transferring data from source LD regions to target LD regions;
selecting a region move from the task;
determine a load on the physical storage devices that would be involved in the region move;
process the region move by transferring data from a source LD region to a target LD region when the load of the region move would be below a predetermined threshold; and
selecting a next region move in the task and repeating said determine and said process for the next region move when the load of the region move would be above the predetermined threshold and there is at least one region move in the task that has not been selected before.

15. The apparatus of claim 14, wherein for said transferring data from the source LD region to the target LD region, the system manager is configured to:
cause writes to the source LD region to be mirrored to the target LD region;
cause data in the source LD region to be copied to the target LD region; and
update a mapping of the virtual volume from the source LD region to the target LD region.

16. The apparatus of claim 14, wherein when there is not at least one region move in the task that has not been selected before, the system manager is further configured to wait for another region move that is currently being performed to finish before said selecting a next region move and said repeating said determine and said process for the next region move in the task.

17. The apparatus of claim 14, wherein for determining a load on the physical storage devices that would be involved in a region move being currently processed, the system manager is configured to:
determine whether one or more current load values from one or more load counters associated with the physical storage devices are greater than one or more thresholds; and
increment the one or more load counters when the one or more current load values are below the one or more thresholds.

18. The apparatus of claim 17, wherein the one or more load counters comprises:
a mirror load counter associated with a first physical storage device that contains the target LD region, the mirror load counter tracking a first load caused by the writes to the source LD region being mirrored to the target LD region;
a first copy load counter associated with the first physical storage device, the first copy load counter tracking a second load to the first physical storage device caused by the data in the source LD region being copied to the target LD region; and
a second copy load counter associated with a second physical storage device that contains the source LD region, the second copy load counter tracking a third load to the second physical storage device caused by the data in the source LD region being copied to the target LD region.

* * * * *

UNITED STATES PATENT AND TRADEMARK OFFICE
CERTIFICATE OF CORRECTION

PATENT NO.         : 7,502,903 B2                                   Page 1 of 1
APPLICATION NO. : 11/269399
DATED                 : March 10, 2009
INVENTOR(S)       : Sushil Thomas and Ashok Singhal It is certified that error appears in the above-identified patent and that said Letters Patent is hereby corrected as shown below:

Column 24, line 31, claim 10: Cancel "staffing" and substitute --starting--.

Column 24, line 35, claim 10: Cancel "staffing" and substitute --starting--.

Signed and Sealed this

Nineteenth Day of May, 2009

JOHN DOLL
*Acting Director of the United States Patent and Trademark Office*